US007002465B2

(12) United States Patent
Komatsu et al.

(10) Patent No.: US 7,002,465 B2
(45) Date of Patent: Feb. 21, 2006

(54) SECURITY SYSTEM OF CONSTRUCTION MACHINE

(75) Inventors: Hideki Komatsu, Ibaraki (JP); Hiroyuki Adachi, Ibaraki (JP); Kazuhiro Shibamori, Ibaraki (JP); Koichi Shibata, Ibaraki (JP); Itsuo Kondo, Ibaraki (JP); Toshinori Kimura, Ibaraki (JP); Genroku Sugiyama, Ibaraki (JP); Toichi Hirata, Ibaraki (JP); Tadatoshi Shimamura, Ibaraki (JP); Yuji Nagashima, Ibaraki (JP); Hiroshi Watanabe, Ibaraki (JP)

(73) Assignee: Hitachi Construction Machinery, Tokyo (JP)

( * ) Notice: Subject to any disclaimer, the term of this patent is extended or adjusted under 35 U.S.C. 154(b) by 276 days.

(21) Appl. No.: 10/381,336

(22) PCT Filed: Apr. 17, 2002

(86) PCT No.: PCT/JP02/03834

§ 371 (c)(1),
(2), (4) Date: Mar. 25, 2003

(87) PCT Pub. No.: WO02/088478

PCT Pub. Date: Nov. 7, 2002

(65) Prior Publication Data

US 2004/0004540 A1 Jan. 8, 2004

(30) Foreign Application Priority Data

| | | | |
|---|---|---|---|
| Apr. 25, 2001 | (JP) | ............................ | 2001-127125 |
| May 1, 2001 | (JP) | ............................ | 2001-134289 |
| Jul. 23, 2001 | (JP) | ............................ | 2001-221517 |
| Jul. 26, 2001 | (JP) | ............................ | 2001-225260 |

(51) Int. Cl.
*G08B 1/00* (2006.01)

(52) U.S. Cl. ............. 340/531; 340/539.1; 340/426.11; 340/426.13; 340/539.13; 340/539.22; 340/426.14; 340/426.15; 340/426.18; 340/426.19; 340/426.2; 340/426.1; 340/679

(58) Field of Classification Search ................ 340/531, 340/539.1, 426.11, 426.13, 539.13, 539.22, 340/426.14, 426.15, 426.18, 426.19, 426.2, 340/426.1, 679

See application file for complete search history.

(56) References Cited

U.S. PATENT DOCUMENTS 6,204,772 B1 * 3/2001 DeMay et al. ........... 340/686.1

(Continued)

FOREIGN PATENT DOCUMENTS

CN 1248751 A 3/2000

(Continued)

OTHER PUBLICATIONS

Correspondance from Patent Office of People's Republic of China, for Chinese Patent Application No. 02802054.5, dated Oct. 29, 2004.

*Primary Examiner*—Daryl C Pope
(74) *Attorney, Agent, or Firm*—Sughrue Mion, PLLC

(57) ABSTRACT

A security system of a construction machine of the present invention has a construction machine, a base station and a communication device. The construction machine comprises a data sending and receiving portion for sending first information, a storage portion for storing received information, and a control portion for controlling an operation of the construction machine. The base station receives the first information from the data sending and receiving portion of the construction machine and sends second information to the construction machine and manages the construction machine. It is configured so that the communication device is connected to the base station through a communication network and can send third information to the construction machine through the base station.

32 Claims, 24 Drawing Sheets

U.S. PATENT DOCUMENTS

| | | | | |
|---|---|---|---|---|
| 6,337,621 | B1 * | 1/2002 | Ogino et al. | 340/425.5 |
| 6,408,952 | B1 * | 6/2002 | Brand et al. | 175/24 |
| 6,803,854 | B1 * | 10/2004 | Adams et al. | 340/531 |

FOREIGN PATENT DOCUMENTS

| | | | |
|---|---|---|---|
| JP | 2-54593 | B2 | 11/1990 |
| JP | 8-301072 | | 11/1996 |
| JP | 9-50584 | | 2/1997 |
| JP | 10308983 | A | 11/1998 |
| JP | 2000-73411 | | 3/2000 |
| JP | 2000099143 | A | 4/2000 |

* cited by examiner

SECURITY SYSTEM OF CONSTRUCTION MACHINE

TECHNICAL FIELD

The present invention relates to a system for managing an operating state of a construction machine such as an oil hydraulic shovel, and particularly to a security system of the construction machine capable of coping with an accident or theft by giving and receiving information using a portable communication device.

BACKGROUND ART

Problems in which a construction machine is stolen from a construction site have occurred frequently. A construction machine provided at a work site of a remote place is often left at the work site during work. Such a work site differs from a storage place of the construction machine monitored by an owner or a manager and theft prevention measures are insufficient and it becomes a situation in which theft tends to occur.

A theft prevention apparatus of an oil hydraulic construction machine is disclosed in JP-A-9-50584. In this theft prevention apparatus, when a predetermined personal identification number is entered at a key input device, a pilot oil hydraulic source is communicated with a pilot valve and an action of an oil hydraulic device is permitted. When the personal identification number is not inputted, the pilot oil hydraulic source and the pilot valve are shut off and the action of the oil hydraulic device is prohibited. There is also a description to the effect that the action of the oil hydraulic device is permitted by inserting an IC card instead of key input.

A theft prevention apparatus of an oil hydraulic construction machine is disclosed in JP-A-8-301072. In this theft prevention apparatus, when a predetermined personal identification number is not inputted from a key input device, even in the case of performing an engine starting operation, a starter circuit does not operate and starting of an engine is prohibited.

However, in the theft prevention apparatus of these construction machines, an operation different from normalcy of key input or insertion of the IC card every time the engine attempts to be started must be performed and its operation is troublesome. Also, in case of forgetting the personal identification number or forgetting to carry the IC card, the construction machine cannot be operated and there is also a disadvantage incapable of doing work.

On the other hand, a system for notifying a server of a management center for managing a construction machine of position information about said construction machine is disclosed in JP-A-2000-73411. According to this system, for example, an operating area of the construction machine is preset and a manager resident in the management center decides whether or not to deviate from the operating area based on position information sent from the construction machine to the management center through an artificial satellite. When the system decides that it deviates from the operating area, for example, it is configured so as to stop an engine by sending a signal for stopping an engine of the construction machine from the management center to the construction machine and breaking the passage of electric current through an engine starter motor and cutting fuel. The system acquires the position information about the construction machine all the time using a GPS (Global Positioning System).

In the management center side, by receiving this notification, occurrence of theft of the construction machine can know early and proper measures, for example, a report to the police or arrangements for an alternative machine, etc. can be taken speedily.

However, when the theft of the construction machine occurs, only sending of the position information to the management center is insufficient. That is, there are cases that a manager resident in the management center for managing the construction machine is absent or the number of persons sufficient to take proper measures cannot be obtained. Further, there is a case that the manager oneself cannot take full measures. Because of that, delay of measures against such a situation occurs, and there occur disadvantages in which finding of the stolen construction machine and its recovery become impossible or in which work cannot be continued at its work site.

Also, other than the theft described above, there is a case that the construction machine fails at the work site and results in being unable to operate. In such a case, a serviceman etc. are immediately sent to make repairs, or measures in which consultation from an operator of the construction machine is received, etc. are required. However, even though a system for sending information about an accident etc. from the construction machine side to a server is built, there is a case that speedy measures cannot be taken still. In addition, although it is extremely important to know the present and past operating information about the construction machine to make its repair, when an accident such as a failure of the construction machine occurs, there is a case that exact measures cannot be taken even though occurrence of a failure etc. is reported from the server to the serviceman etc.

Also, it is conceivable that a communication device provided in the construction machine is detached or destroyed. In this case, because the construction machine cannot send the position information to the server of the management center and the management center does not know whether or not the construction machine is within a work area, the management center cannot decide whether or not to stop a run of the construction machine. Even though the management center sends a run stop signal for stopping the run of the construction machine, the construction machine cannot receive its run stop signal and speedy measures against theft cannot be taken.

DISCLOSURE OF THE INVENTION

The present invention is implemented in view of such circumstances, and an object of the invention is to provide a security system of a construction machine capable of speedily coping with a case that a situation necessary to urgently cope with theft etc. of the construction machine occurs.

According to the present invention for achieving the object described above, there is provided a security system of a construction machine, comprising a construction machine comprising a data sending and receiving portion for sending first information, a storage portion for storing received information and a control portion for controlling an operation of the construction machine, a base station for receiving the first information from the data sending and receiving portion of the construction machine and sending second information to the construction machine and managing the construction machine, and a communication device which is connected to the base station through a communication network and can send third information to the construction machine through the base station.

The first information may relate to operating information about the construction machine, and the communication device requests acquisition of the first information from the base station. The communication device may comprise one or plural fixed type and portable type communication devices.

The communication network between the base station and the communication device is the Internet, and the fixed type communication device is a terminal including a personal computer capable of being connected to the communication network, and the portable type communication device comprises a portable phone.

The first information includes information about theft of the construction machine. The first information may be sent from the base station to the communication device by electronic mail.

The storage portion stores an operable operating area, and the control portion decides that the construction machine has been stolen when it is detected that the construction machine moves beyond the operating area. The second information includes information about the operating area and is stored in the storage portion as a new operating area when the construction machine receives the information about the operating area. The communication device sends the third information to the base station and thereby the base station sends the second information to the construction machine. When the operating area is set, the construction machine sends an answer back signal indicating the completion of setting of the operating area to the base station and thereby the base station knows the completion of setting of the operating area.

Also, the first information includes information about failure/accident of the construction machine.

The first information includes information as to whether the construction machine is operating or stopping at present and information about cumulative operating time. The communication device requests the base station to acquire the first information from the construction machine, and the base station sends the second information so as to acquire the first information from the construction machine at a point in time of receiving the third information from the communication device.

Information about an operation of the construction machine is regularly sent from the construction machine to the base station as operating history information, and the operating information about the construction machine is acquired by the communication device through the Internet.

The second information sent from the base station includes information about an operable time zone or an operable period of the construction machine. The storage portion of the construction machine stores the operable time zone or the operable period of the construction machine based on the second information, and the control portion of the construction machine prohibits an operation of the construction machine beyond the operable time zone or the operable period stored.

The third information sent from the communication device relates to the operable time zone or the operable period in the base station, and the base station sends the second information to the construction machine based on the third information received from the communication device. Here, the operation includes at least travel.

The construction machine comprises a position detecting portion for detecting a position of said construction machine. When a predetermined operation is performed with respect to the construction machine, the control portion reads the operating area stored in the storage portion and also inputs the present position information of the construction machine from the position detecting portion and compares the operating area with the position information of the construction machine. Here, the predetermined operation is a starting operation of a prime mover provided in the construction machine.

In the case of deciding that the construction machine is beyond the operating area, the control portion outputs a signal for prohibiting an operation of the construction machine, and sends the decision result to the base station.

The communication device may be a portable type communication terminal, and further the portable type communication terminal may be a portable phone.

The base station is provided with map information, and the base station or the communication device reads the map information, and the operating area is set based on this read map information. The map information is divided into plural sections, and the base station or the communication device selects and sets an operating area from among the divided sections. Plural areas can be set as the operable area.

The construction machine comprises a position detecting portion for detecting a position of the construction machine. When a state in which a signal according to information from the outside cannot be received by the control portion of the construction machine occurs and the duration of the signal non-receivable state exceeds reference time, the control portion prohibits engine starting of the construction machine or breaks an oil hydraulic system.

When a state in which a signal according to a position by the position detecting portion cannot be received occurs and the duration of the signal non-receivable state exceeds reference time, engine starting of the construction machine is prohibited or an oil hydraulic system is broken.

When a state in which the control portion cannot receive a signal according to information from the center server occurs and the duration of the signal non-receivable state exceeds reference time, engine starting of the construction machine is prohibited or an oil hydraulic system is broken.

The construction machine comprises a disconnection detection portion comprising a disconnection detection wiring, and a concentration cable formed by bundling antenna wiring of the position detecting portion, antenna wiring of the sending and receiving portion and the disconnection detection wiring. When the disconnection detection wiring is cut at the time of cutting of the concentration cable, the control portion prohibits engine starting of the construction machine or breaks an oil hydraulic system according to a disconnection detection signal sent from the disconnection detection portion.

The engine starting is prohibited by breaking a current-carrying system or a fuel supply system of the construction machine.

BEST MODE FOR CARRYING OUT THE INVENTION

Figure 1:
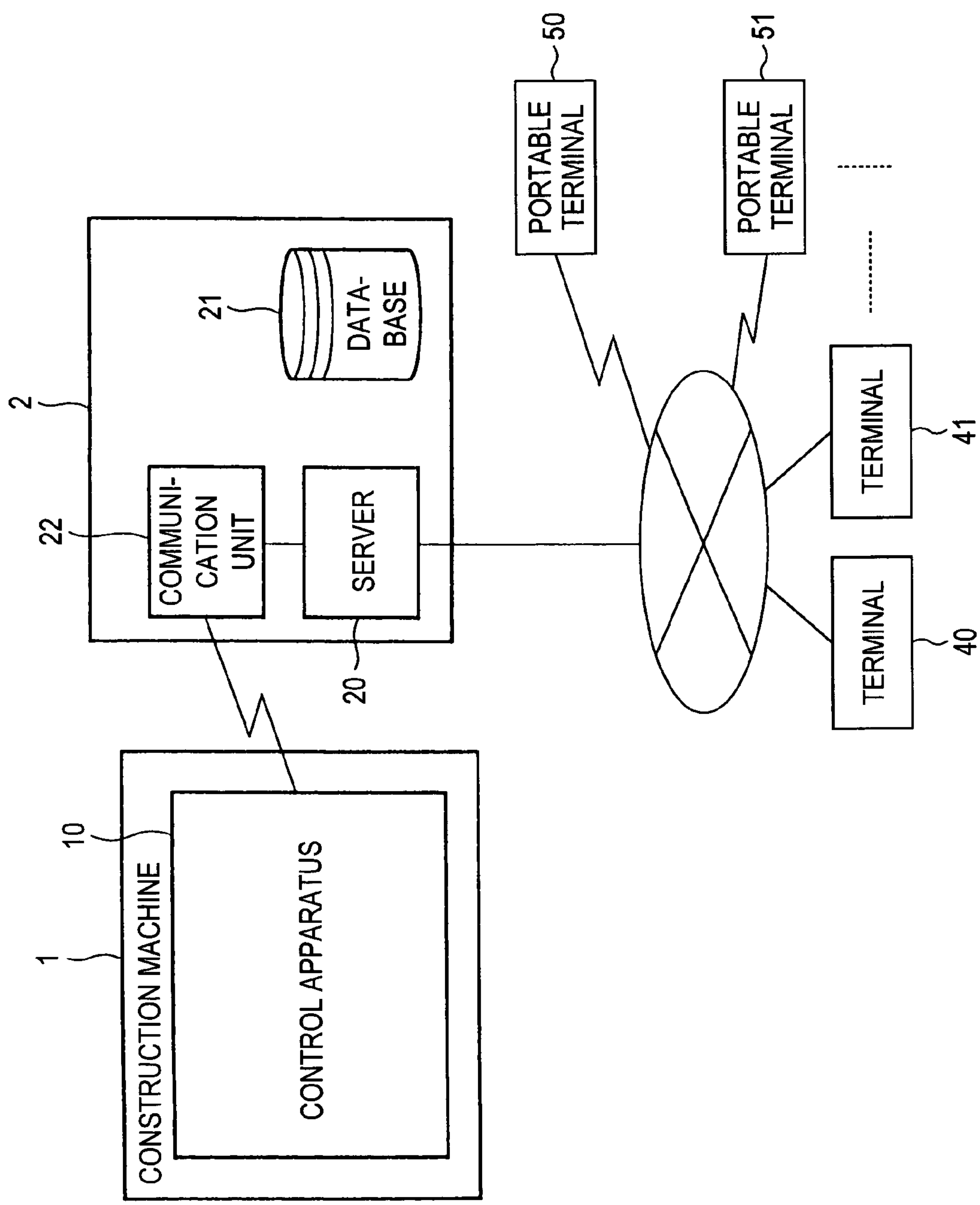
FIG. 1 is the whole configuration diagram of a management system of a construction machine in a first embodiment of the present invention.

First to fourth embodiments of the present invention will be described below with reference to the drawings.

First Embodiment

Management of a construction machine may be performed directly by its owner, however, for example, a method for performing centralized management by a subcontract to a management center owned by a construction machine maker is also being adopted widely. Also, in recent years, a method in which a contractor for doing works receives loan of a construction machine from a rental company or a lease company is becoming widespread. Further, a construction machine maker or a service company leading experienced servicemen etc. generally performs maintenance such as maintenance, inspection and necessary repair of the construction machine. That is, a contractor for operating the construction machine and doing works actually, an owner, a manager, a supporter for performing maintenance, etc. are concerned in the construction machine. In case that an abnormal situation such as theft occurs in the construction machine, the owner as well as the manager for managing said construction machine have very important concern and further, the fact that the supporter for performing maintenance, etc. realizes such an abnormal situation is very effective in taking measures against the situation.

Generally, it is configured so that a server is provided in the management center for managing a construction machine and various information is given and received between this server and the construction machine. In the present invention, it is configured so as to build a communication network between a communication device held by each of the concerned parties described above, namely the owner of the construction machine or the supporter for performing maintenance, etc. and the server. Here, the communication device for building the communication network includes terminals of a personal computer etc. placed in an office of a lease company, a rental company, etc., namely a fixed type communication device or a portable type communication device including a portable phone. Communications of necessary information are conducted between the server and the fixed type and portable type communication devices.

First, it is placed so that predetermined information can be transmitted from the server to all the communication devices or it is placed so that access can be obtained from all the communication devices to the server. This information includes theft information about a construction machine. In this theft information, notification that abnormality has occurred is received by the server or is detected by the server through communication from the construction machine and it is necessary to urgently inform each the concerned party of this information, so that it is generally configured so as to passing the information to all the communication devices instantaneously.

In the fact that a construction machine has been stolen, it is configured so as to set an operating area of said construction machine and monitor a location of this construction machine by a GPS. Then, it is considered that this construction machine has been stolen when the construction machine moves beyond the set operating area. Therefore, when the operating area of the construction machine is set, it is configured so that the server present in the management center makes this area setting basically. However, it is desirably configured so that persons in authority in addition to this, for example, the owner of the construction machine, etc. can also make the setting. In this case, a particular machine (a terminal in authority) or a portable phone always carried by a management representative among the terminals of a personal computer etc. placed in an office of a lease company or a rental company, etc. makes the area setting through the server. In this case, the fact that the area setting has been made actually is sent from the construction machine side to the server as an answer back signal. Then, in the case that the area setting has been made by the terminal in authority, an answer back signal is transferred from the server to this terminal.

There are cases that a construction machine fails or results in an inoperable state for some reason as information that is desirable to urgently inform each the concerned party other than theft. Thus, when a situation of a failure etc. occurs, notification is provided from the construction machine side to the server by communication. When the server receives this notification, it communicates with all the fixed type and portable type communication devices still. The theft information or information such as theft information and accident information necessary to urgently notify is transmitted by electronic mail.

Information about actual operating time of the construction machine is extremely important for a lease company or a rental company, etc. for relation of a demand for charge and so on. Also, when a serviceman etc. of a service company, a supporter of the construction machine can acquire information about an operating state or an operating history, etc. of the construction machine at the time of receiving the failure information described above or the time of performing maintenance, etc., it is very useful to make inspection or repair, etc. of the machine. However, this kind of information can have only to acquire information according to a request as required. Whether the fixed type or portable type communication device, each the communication device building a communication network is configured so that these information can be required of the server.

With respect to an operating state of the construction machine, that is, whether or not it is operating at present and cumulative operating time among the required information described above, the construction machine called from the server to acquire these information. Then, it is transferred from the server to the communication device which has required. On the other hand, an operating history of the construction machine becomes vast information, so that the information is sent from the construction machine side to the server, for example, once per day. Then, this operating history information is edited in an easy-to-view state by performing various processing in the server side and is published on a home page. Therefore, when this home page is viewed from each the communication device, information about the operating history of the construction machine can be acquired in arranged form.

A first embodiment of the present invention will be described below in detail with reference to FIGS. 1 to 5.

FIG. 1 is a diagram showing the whole configuration of a security system in the embodiment in the present invention. The system comprises a construction machine 1, a management center 2 for managing the construction machine, a control apparatus 10 which is provided in the construction machine and includes sending and receiving means, a server 20 provided in the management center, a database 21 for accumulating operating information and the other necessary information about the construction machine, a communication unit 22 for communicating with the control apparatus 10 provided in the construction machine, and an intranet and Internet 30. Incidentally, sending and receiving are performed between the construction machine 1 and the management center 2 using satellite communication or a portable communication network and so on.

Also, numerals 40, 41, . . . are terminals capable of setting an operating area etc. in which the construction machine 1 operates (hereinafter generically called terminals 40), and numerals 50, 51, . . . are portable terminals (hereinafter generically called portable terminals 50). Here, the terminal 40 is a fixed type communication device made of a personal computer etc. placed in an office of an owner of the construction machine, for example, a rental company, a lease company and so on. This terminal 40 is means for setting the operating area of the construction machine 1 along with the server 20 as a terminal in authority as described below. Also, the terminal 40 includes a fixed type communication device placed in a service company for supporting this construction machine. However, the fixed type communication device in the service company can also be limited so that the operating area cannot be set. Also, the portable terminal 50 is a portable type communication device including a portable phone etc. registered as a concerned party of the construction machine 1. A communication network is formed between these one or plural terminals 40 and portable terminals 50 and the server 20. Here, the portable terminal 50 forming the communication network is means carried by a particular person concerned in the construction machine 1, for example, its owner, a supporter such as a serviceman, etc. (herein after called a concerned party). It may be configured so that the operating area can be set from, for example, a portable phone owned by a manager in a rental company or a lease company, etc. among these portable terminals 50.

The server 20 is connected to the database 21 and the communication unit 22, and performs setting of an operating area in which the construction machine 1 operates, acquisition of operating information about the construction machine 1, setting of an electronic mail address sent in case of theft occurrence, etc. and the other processing, and sends a matter such as theft occurrence necessary to urgently make contact with the concerned party to the preset electronic mail address by electronic mail. The database 21 is connected to the server 20, and stores information about the construction machine 1 or the electronic mail address etc. for sending electronic mail. The communication unit 22 is connected to the server 20, and sends and receives data to the control apparatus 10 provided in the construction machine 1. The terminal 40 is connected to the intranet and Internet 30, and setting of an area in which the construction machine 1 operates or setting of an electronic mail address for sending electronic mail, etc. are made. Also, in case that theft occurs, the terminal 40 receives a notification to the effect that the theft occurs by electronic mail. The portable terminal 50 is configured so as to be able to be connected to the Internet 30 always, and receives a notification necessary to urgently notify in case that theft occurs, etc. by electronic mail. Also, more detailed operating information about the construction machine 1 can be acquired by requesting acquisition of information from the server 20 through the Internet 30.

Figure 2:
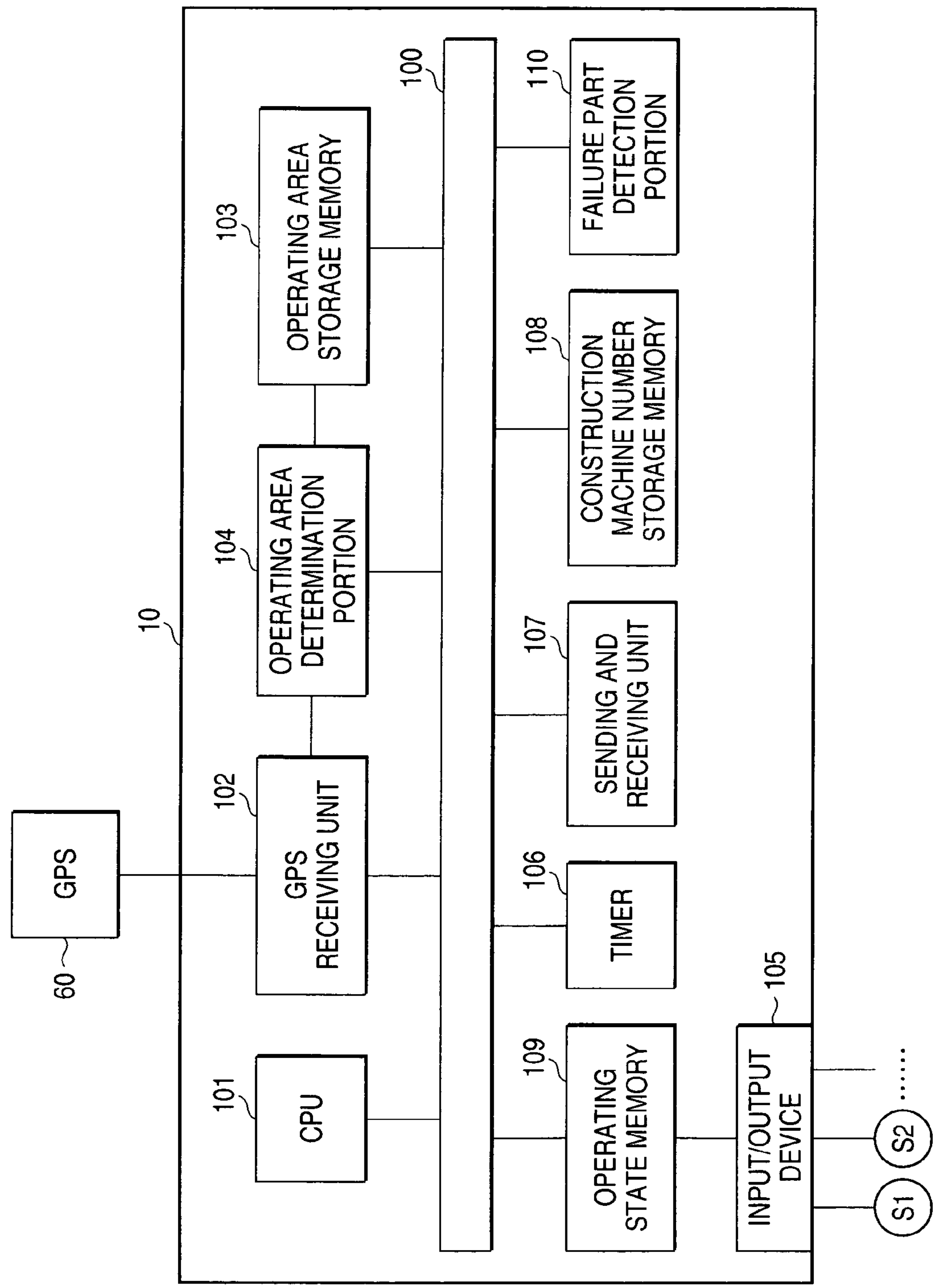
FIG. 2 is a block diagram showing a configuration of a control apparatus of the construction machine in the first embodiment of the present invention.

FIG. 2 is a diagram showing a configuration of the control apparatus 10 provided in the construction machine 1. In FIG. 2, numeral 100 is a bus connected to a CPU 101, a GPS receiving unit 102, operating area storage memory 103, an operating area determination portion 104, operating state memory 109, a timer 106, a sending and receiving unit 107, machine number storage memory 108 of the construction machine 1, and a failure part detection portion 110.

The CPU 101 is a central processing unit connected to the bus 100, and performs control of the GPS receiving unit 102, the operating area storage memory 103, the operating area determination portion 104, the operating state memory 109, the timer 106, the sending and receiving unit 107, the machine number storage memory 108 and the failure part detection portion 110. The GPS receiving unit 102 is connected to the bus 100 and the operating area determination portion 104, and receives a position of the construction machine 1 from a GPS 60, and sends data of the position of the construction machine 1 to the operating area determination portion 104. The operating area storage memory 103 is connected to the bus 100 and the operating area determination portion 104, and previously stores an operating area in which the construction machine 1 operates. The operating area determination portion 104 is connected to the bus 100, the GPS receiving unit 102 and the operating area storage memory 103, and always monitors whether or not the present position of the construction machine 1 obtained from the GPS receiving unit 102 deviates from the operating area stored in the operating area storage memory 103. The operating state memory 109 is connected to the bus 100 and an input/output device 105, and stores an operating state of the construction machine 1. The timer 106 is connected to the bus 100, and holds the time and date. The sending and receiving unit 107 is connected to the bus 100, and sends and receives data between the control apparatus 10 and the management center 2. The machine number storage memory 108 is connected to the bus 100, and stores the number of the construction machine 1. The input/output device 105 is connected to the operating state memory 109 and sensors or the like S1, S2, S3, . . . provided in each place of the construction machine 1, and is configured so that information about operating states such as operating time and the number of revolutions of an engine, driving time of an oil hydraulic pump or each an oil hydraulic actuator, etc., variations in working pressure of each the oil hydraulic actuator, or various information, such as residual amounts of a fuel tank and a working oil tank, about the construction machine 1 is written into the operating state memory 109.

In the basic configuration described above, it is configured so that various information can be transmitted between the construction machine 1 and the server 20, between the server 20 and the terminals 40, and between the server 20 and the communication terminals 50. As a variety of these information transmission, there are operating area setting of the construction machine 1, information about theft of the construction machine 1, information about an accident other than theft, information about an operating state of the construction machine 1, information about an operating history, and so on.

An operating area of the construction machine 1 is a criterion for determining whether or not the construction machine 1 has been stolen. The operating area is set by the server 20 and the terminal 40 or the particular portable terminal 50. The construction machine 1 operates at a predetermined work site and in view of the nature, travel of a long distance is not performed. Therefore, it may be configured so that a relatively narrow area can be set as the operating area. In setting aspects, a method for using the present position of the construction machine 1 as a criterion and a method for using administrative sections such as prefectures or municipalities as a criterion are generally used.

When the operating area is set by either method, in the case of making setting from the terminal 40, this information is transmitted from the Internet 30 to the server 20, and also in the case of making setting in the server 20 side, it is directly sent from the server 20 to the sending and receiving unit 107 of the construction machine 1 and is stored in the operating area storage memory 103. Since data about this operating area setting is very important, when information is captured in the operating area storage memory 103, it is sent to the server 20 as an answer back signal. Also, in the case of setting the area in the terminal 40, the answer back signal is transferred from the server 20 to said terminal 40.

Here, it is decided that the construction machine 1 has been stolen when it is detected that the construction machine 1 has moved beyond the area set as described above. When it is decided that it has been stolen, theft information is immediately sent from the sending and receiving unit 107 forming the control apparatus 10 of the construction machine 1 to the server 20. This theft information is extremely important and urgent information and it is necessary to speedily notify all the portable terminals 50 carried by concerned parties as well as a manager of the terminals 40 of the theft information. Therefore, this theft information is instantaneously sent to all the terminals 40 and all the portable terminals 50 as urgent information by electronic mail. Incidentally, the same applies to the case of setting the operating area from the particular portable terminal 50.

Also, in the case that the construction machine 1 fails or becomes an inoperable state (hereinafter called failure information) except for the case that an engine stops, that is, a power source stops and the control apparatus 10 does not operate, in a manner similar to the theft information, failure information is sent from the construction machine 1 to the server 20 and this information is also immediately sent to all of the terminals 40 and the portable terminals 50 by electronic mail.

Further, operating state information about the construction machine 1 is recorded from various sensors or the like S1, S2, . . . to the operating state memory 109 through the input/output device 105 by the control apparatus 10 of the construction machine 1. Therefore, in the case of making a request from any of the terminals 40 or the portable terminals 50, it is configured so that the server 20 calls the construction machine 1 and requested information is acquired. Here, particularly in the case that there is a special reason that a display screen of a portable phone acting as the portable terminal 50 is small, etc., it is configured so as to fetch only predetermined limited information. This operating state information includes at least information as to whether or not the construction machine 1 is operating at present and cumulative operating time of that day, and also is limited to cumulative operating time to the present since the construction machine was carried into a work site or only the other necessary information.

Then, an operating history of the construction machine 1 is various data about operation of the construction machine 1 of, for example, one day and this data is accumulated in the operating state memory 109. Then, said data is sent from the construction machine 1 to the server 20, for example, once per day. Information received by the server 20 is published on a home page of the Internet 30 as an easy-to-view list form etc. by performing various processing in the side of this server 20. Therefore, the terminals 40 and the portable terminals 50 can acquire information about the operating history of the construction machine 1 by opening this home page.

Figure 3:
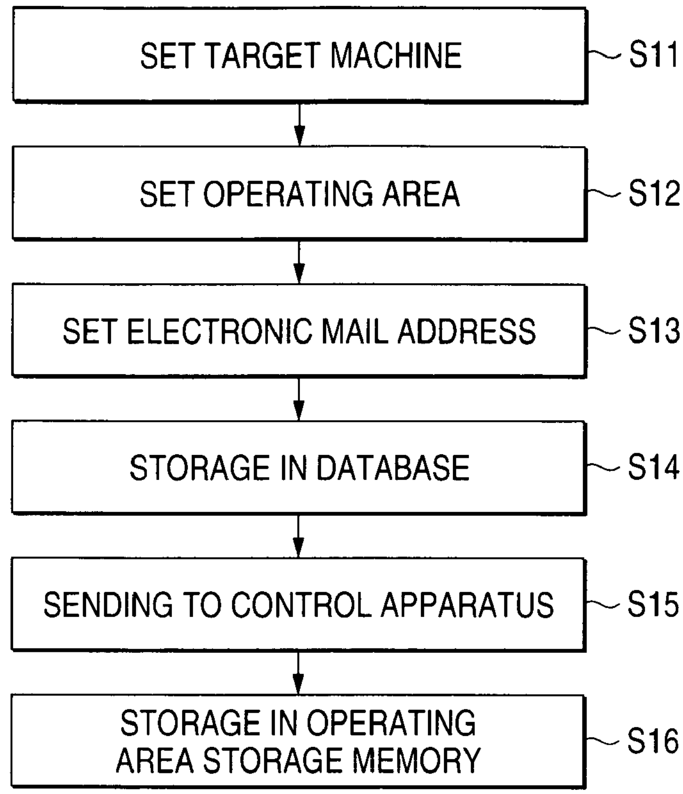
FIG. 3 is a flowchart diagram showing a setting procedure of an operating area of the construction machine in the first embodiment of the present invention.
Figure 4:
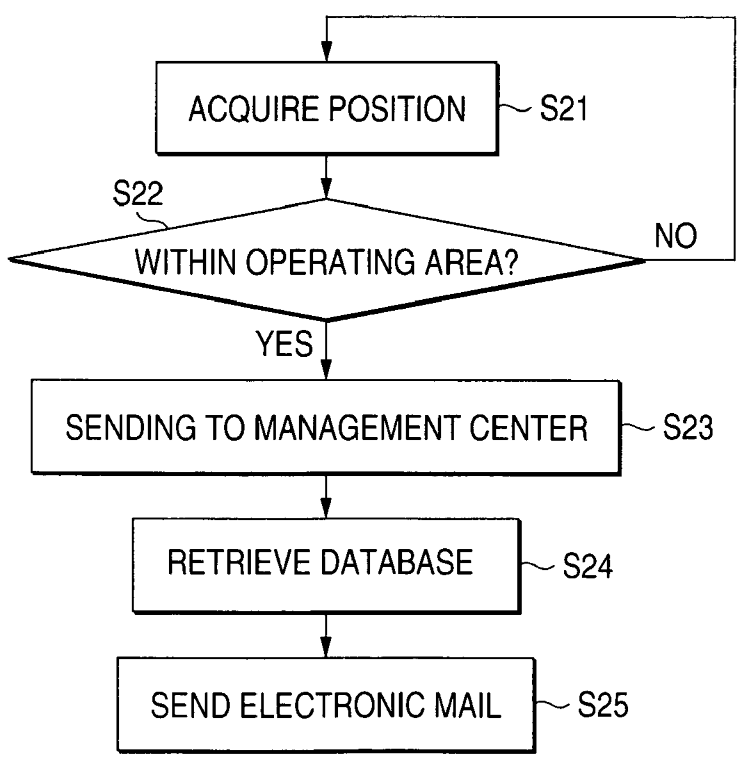
FIG. 4 is a flowchart diagram showing a management procedure of theft information.

Thus, a processing procedure about management of theft information will first be described based on flowcharts of FIGS. 3 and 4. First, as shown in FIG. 3, persons in authority such as a manager for managing the construction machine 1 and an owner of the construction machine 1 (hereinafter, called operating area setting authorities) perform initialization using the terminals 40, 50 connected to the server 20 through the intranet and Internet 30 or the server 20. In this case, for the purpose of making it impossible to make setting by persons other than the operating area setting authorities, a limit to the setting is imposed using an ID and a password. The operating area setting authority first identifies a construction machine for performing initialization (step S11). This is performed for identifying a construction machine for performing initialization when the management center for managing the construction machine manages plural construction machines. In the present embodiment, identification of the construction machine is made by the number of the construction machine, but is not limited to this.

Next, an operating area in which a target construction machine operates is set (step S12). In setting of this operating area, a possible area in which the construction machine moves in the case of doing work etc. is set and when the construction machine exceeds the set area, it is recognized that theft has occurred and notification to the server 20 of the management center is provided. Incidentally, this operating area can be set freely, for example, an area of a quadrilateral obtained from coordinates of four points or a circle obtained from the center and a radius (see FIG. 23) is set using the present position of the construction machine 1 as a criterion, or an area is set as a unit etc. of administrative sections such as prefectures or municipalities (see FIG. 14). Then, when theft has occurred, a manager of the server 20 sets an electronic mail address of a destination notified of the theft (step S13). At this time, all the electronic mail addresses of the portable terminals 50 owned by concerned parties, specifically portable phones etc. of the concerned parties as well as the terminals 40 or the particular portable terminals 50 are also set. These identification of the construction machine, setting of the operating area and setting of the electronic mail address are made on a home page stored in the server 20, and the registered contents are stored in the database 21 connected to the server 20 (step S14). Incidentally, in the setting of the electronic mail address, only the change contents are set in the case of change after setting is first made.

Then, the number of the construction machine and the set operating area among the registered contents are sent to the sending and receiving unit 107 of the control apparatus 10 provided in the construction machine 1 from the communication unit 22 through wireless. The sent contents are stored in the machine number storage memory 108 and the operating area storage memory 103 through the bus 100 (step S16). Incidentally, in the present embodiment, setting of the number of the construction machine is made from the management center 2 by wireless, but is not limited to this, and the number of the construction machine maybe set in the machine number storage memory 108. As a result of this, the operating area can be set in the construction machine 1. The initialization ends above.

Next, an actual action for managing theft information will be described based on the flowchart of FIG. 4. After performing the initialization in the procedure of FIG. 3, it is determined whether or not the construction machine 1 is actually present within the operating area always. That is, the GPS receiving unit 102 provided in the control apparatus 10 acquires a position of the construction machine 1 with predetermined timing from the GPS 60 (step S21). The acquired position is sent to the operating area determination portion 104. In the operating area determination portion 104, the present position of the construction machine 1 sent from the GPS receiving unit 102 is compared with the operating area stored in the operating area storage memory 103 (step S22) and when it is decided that the present position of the construction machine 1 is within the operating area, theft has not occurred, so that a position of the construction machine 1 is acquired subsequently (step S21).

On the other hand, when it is decided that the present position of the construction machine 1 is beyond the operating area, it is considered that theft may have occurred, and an interrupt is generated to the CPU 101 so as to notify the management center. The CPU 101 receives this interrupt, and instructs the sending and receiving unit 107 to provide notification to the effect that the construction machine 1 is beyond the set operating area with respect to the management center 2. By the instructions of the CPU 101, the sending and receiving unit 107 provides the notification to the effect that the construction machine 1 is beyond the operating area with respect to the communication unit 22 connected to the server 20 of the management center 2 (step S23). At this time, the number of the construction machine stored in the machine number storage memory 108, the time and date held by the timer 106 and the present position received by the GPS receiving unit are sent from the sending and receiving unit 107. When the server 20 receives the notification to the effect that the construction machine 1 is beyond the operating area, it is decided that the construction machine 1 may have been stolen. At this time, the database 21 is retrieved based on the number of the construction machine sent at the same time (step S24). Plural electronic mail addresses corresponding to the number of the construction machine are stored in the database 21. That is, electronic mail addresses of each the terminal 40 and each the portable terminal 50 necessary to provide notification of this theft information are detected by retrieving the database 21.

Thus, the server 20 sends electronic mail to the retrieved plural electronic mail addresses through the Internet 30 (step S25). Time beyond the operating area and information about a position immediately before being beyond the operating area in addition to the number of the construction machine which is beyond the operating area are attached to this electronic mail. By the above, when theft of the construction machine 1 has occurred, all the concerned parties can know that theft instantaneously. As a result of this, measures can speedily be taken against the theft of the construction machine. That is, a report to the police, arrangements for an alternative machine, the other post processing performed at a work site, etc. can be made speedily. By enabling speedy measures in this manner, the possibility capable of taking back the stolen machine increases and also occurrence of trouble with subsequent work at the work site can be suppressed to a minimum.

The above procedure relates to the theft information about the construction machine 1, and failure information, which is urgent information comparable to this theft information, about the construction machine 1 is also instantaneously reported to the terminals 40 and the portable terminals 50 held by the concerned parties of this construction machine 1 by a similar procedure. In the theft information by the fact that the construction machine 1 is beyond the operating area, it has only to report the number of the construction machine 1 which is beyond the operating area, time beyond the operating area, and a position immediately before being beyond the operating area. On the other hand, in the failure information about the construction machine 1, more detailed information is required. That is, it is desirable to acquire information including at least the thing as to which part of the machine has failed. Thus, it is desirable to provide the failure part detection portion 110 in the control apparatus 10 of the construction machine 1 and send information from this failure part detection portion 110, that is, information as to which part has failed together.

As described above, in order that a person who has received the failure information in this manner copes with that and can always know operating time etc. of the construction machine 1 in a rental company, a lease company, etc., it is configured so that sending of information about operating states of the construction machine 1 can be requested from the terminal 40 or the portable terminal 50 at any time. Thus, a procedure of acquisition of this kind of information is shown in FIG. 5.

Figure 5:
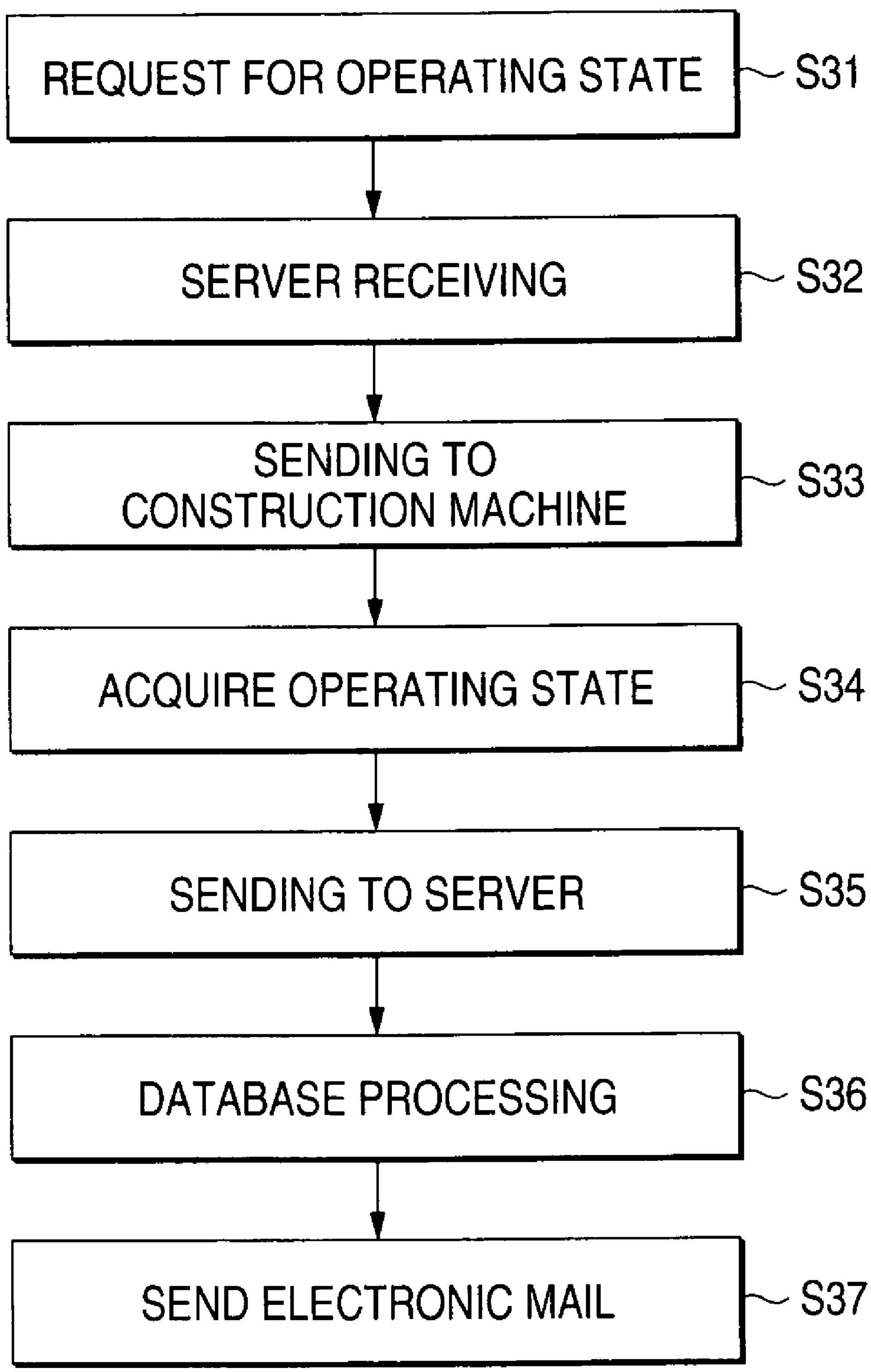
FIG. 5 is a flowchart diagram showing a procedure for acquiring a method about an operating state of the construction machine from the side of a communication device through a server.

That is, in FIG. 5, in the case that a manager or a concerned party acquires information about an operating state of the construction machine 1, notification to the effect that the operating state of the construction machine 1 want to be known is sent from the terminal 40 or the portable terminal 50 to the server 20 (step S31). When the server 20 receives this notification (step S32), notification of its reception is provided with respect to the sending and receiving unit 107 of the control apparatus 10 provided in the construction machine 1 through the communication unit 22 (step S33). The sending and receiving unit 107 generates an interrupt with respect to the CPU 101 in the case of receiving this notification. The CPU 101 instructs the operating state memory 109 to acquire the operating state in the case of receiving this interrupt. The operating state memory 109 acquires data of the operating state of the construction machine 1 from the input/output device 105 (step S34), and sends the data of the operating state of the construction machine 1 to the sending and receiving unit 107. The sending and receiving unit 107 sends the received data of the operating state to the communication unit 22 of the management center 2 (step S35). The server 20 receives data of the operating state of the construction machine 1 from the communication unit 22, and stores the data in the database 21 (step S36). Also, the data of the operating state of the construction machine 1 is sent to a destination of a requester by electronic mail (step S37). At this time, the data of the operating state of the construction machine 1 may be sent to all the electronic mail addresses stored in the database 21 as well as the requester.

Here, with regard to what information is sent as information about the operating state of the construction machine 1, information as to whether or not the construction machine 1 is operating at present and cumulative operating time from that day or the time of being carried into a site are included at the minimum, and further it is desirably configured so that information about a malfunction part etc. can also be sent. Since various data are recorded in the operating state memory 109, all the data accumulated in this operating state memory 109 can also be sent. However, it is not preferable to send a very large amount of information in electronic mail and also a display area of information is narrow in a portable phone acting as the portable terminal 50, so that it is not necessary that information capable of acquisition based on a request should be all the information actually accumulated in the operating state memory 109, and it is desirable to be set to the limited information.

However, it is necessary to be configured so that the concerned parties can be notified of various information about operation of the construction machine 1. Thus, it is set so as to periodically send all the data accumulated in the operating state memory 109 from the construction machine 1 to the server 20, for example, once per day. Then, various information acquired by the server 20 from the construction machine 1 through periodical sending is stored in the database 21 of the server 20 as arranged easy-to-view operating history information such as a daily report form about the construction machine 1 by performing data processing in the side of the server 20. Then, it is set so that a home page for portable terminal is prepared in the server 20 and these information is published on this home page. As a result of this, various information about the operating state of said construction machine 1 can be acquired by viewing the home page from the portable terminal 50. Therefore, in the case of making repairs etc. on failure of the machine, exact measures can be taken by viewing this home page.

Second Embodiment

A second embodiment of the case of applying the present invention to a theft prevention system of an oil hydraulic shovel will be described by FIGS. 6 to 9.

Figure 6:
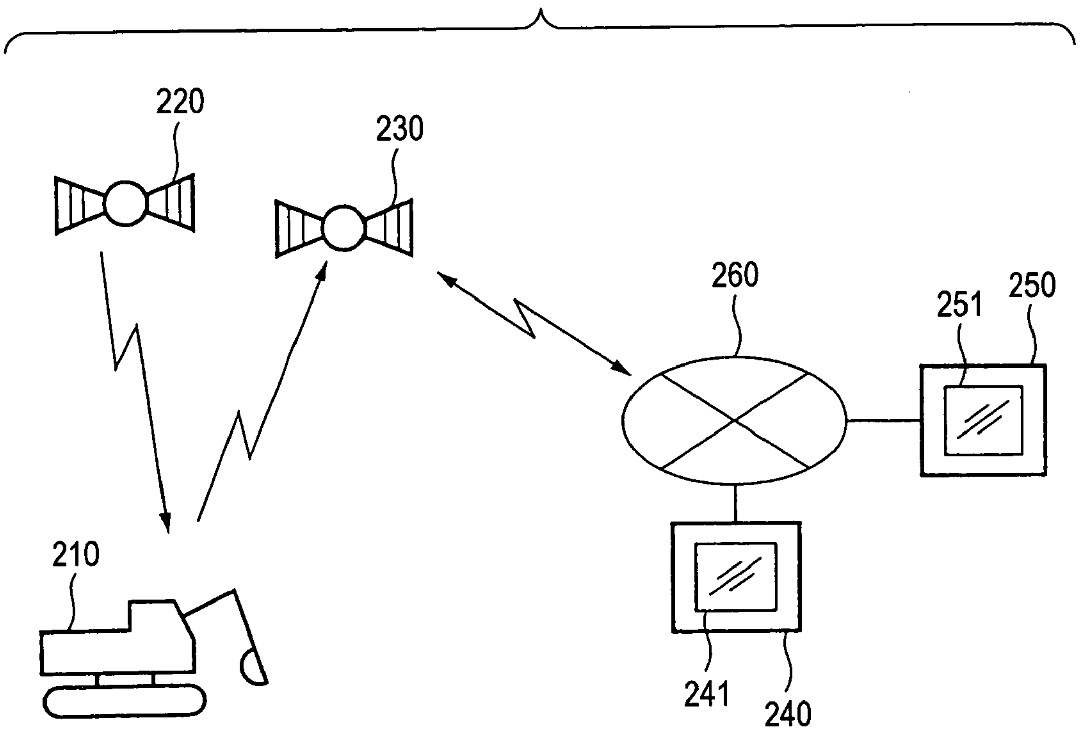
FIG. 6 is a configuration diagram showing a theft prevention system of an oil hydraulic shovel in a second embodiment of the present invention.

FIG. 6 is a configuration diagram of a theft prevention system in the second embodiment. In the present system, information can be sent from a base station 240 placed in a construction machine maker etc. to an oil hydraulic shovel (construction machine) 210 through a communication satellite 230. The sent information includes information about an operable time zone of the oil hydraulic shovel 210, and the oil hydraulic shovel 210 receiving the information takes theft prevention measures of itself based on its information. Information about the operable time zone is based on information from a communication device 250 of a user etc. owning the oil hydraulic shovel 210. A concrete configuration will be described below.

Figure 7:
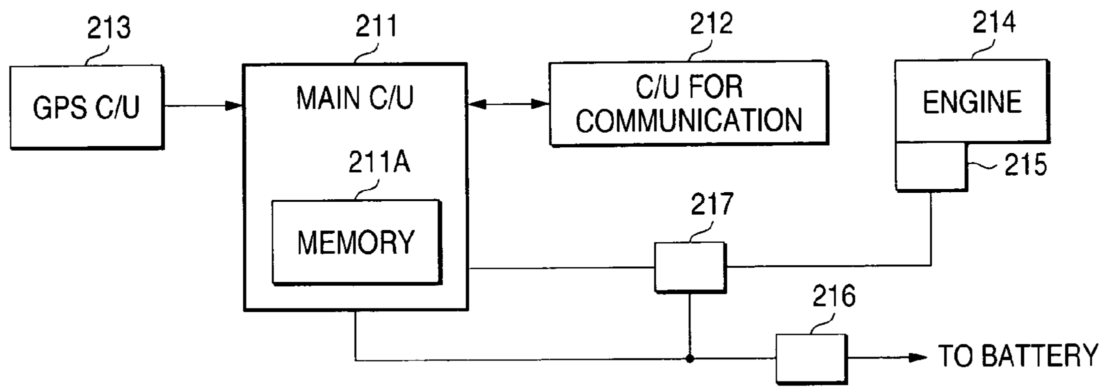
FIG. 7 is a block diagram showing a configuration of a control system of the oil hydraulic shovel.

Each the oil hydraulic shovel 210 has a main control unit 211, a control unit 212 for communication, and a GPS control unit 213 as shown in FIG. 7. The GPS control unit 213 receives radio waves from plural GPS satellites 220 (FIG. 6) and calculates position information about each the oil hydraulic shovel 210 and also acquires the present time. The position information and time information are inputted to the main control unit 211. The position information of these is used for notifying the base station 240 of the present position of the construction machine, and the time information is used for theft prevention described below. The control unit 212 for communication receives operable time zone information etc. sent from the base station 240 and inputs the information to the main control unit 211.

Also, the main control unit 211 switches ON/OFF of a starter relay 217 according to conditions. The starter relay 217 is interposed between a starter motor 215 of an engine 214 and an engine key switch 216, and when the relay 217 is ON, the starter motor 215 is driven with an operation of the key switch 216 and the engine 214 is started. On the other hand, when the relay 217 is OFF, even in the case of operating the key switch 216, a current is not passed through the starter motor 215 and the engine 214 is not started.

A center server 241 is placed in the base station 240. The center server 241 has information sending and receiving functions, and sends information to the oil hydraulic shovel 210 through a communication line network 260 and the communication satellite 230, and receives information sent from the oil hydraulic shovel 210. Also, sending and receiving of information are enabled between the center server 241 and the communication device 250 through the communication line network 260.

A concrete example of theft prevention of the oil hydraulic shovel 210 by the system configured as described above will be described.

A theft prevention method in the present embodiment is a method in which in the case of turning on the engine key switch 216 of the oil hydraulic shovel 210, it is determined whether or not time in that case is within a preset operable time zone and when it is beyond the operable time zone, the engine 214 is not started and travel of the oil hydraulic shovel 210 is prohibited.

In order to implement the above control, each the communication device 250 sends information about the operable time zone of the oil hydraulic shovel 210 owned by my company to the base station 240. For example, the communication device 250 makes access to a Web site of the base station 240 using a terminal device 251, and calls an operating time zone setting page by inputting a password as necessary, and inputs work start time and work end time in this page. As a result of this, the center server 241 of the base station 240 grasps the work start time and the work end time every the communication device 250, and sends these time information toward the oil hydraulic shovel 210.

Figure 8:
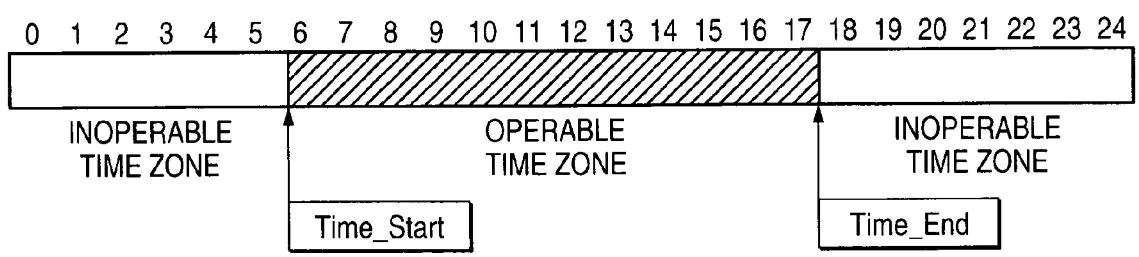
FIG. 8 is a diagram showing one example of operable time zone setting.

The time information sent from the base station 240 is sent to the oil hydraulic shovel 210 owned by a user making setting of the time through the communication line network 260 and the communication satellite 230. The control unit 212 for communication receives the sent time information and inputs the time information to the main control unit 211. The main control unit 211 stores the inputted information, namely work start time and work end time in memory 211A as work start time Time_Start and work end time Time_End of said oil hydraulic shovel 210. In this case, for example, as shown in FIG. 8, a time zone from Time_Start to Time_End is set as an operable time zone and the other time zone is set as an inoperable time zone.

Here, processing for receiving the information from the base station 240 and setting the time zone can be performed also in the case that the engine 214 of the oil hydraulic shovel 210 has stopped. Also, in the case of changing the information set once, the change can be made freely by making access to the Web site of the base station 240 again.

Incidentally, since there is a case that the operable time zone of the oil hydraulic shovel 210 varies depending on work sites, it is desirably configured so that the same user can make plural time settings. In this case, it is necessary for the center server 241 to send accurate time zone information to each the oil hydraulic shovel 210 located at each the work site. This can be implemented, for example, by selecting a sending destination (oil hydraulic shovel 210) according to a password which a user inputs to the communication device 240 in the case of time setting.

Figure 9:
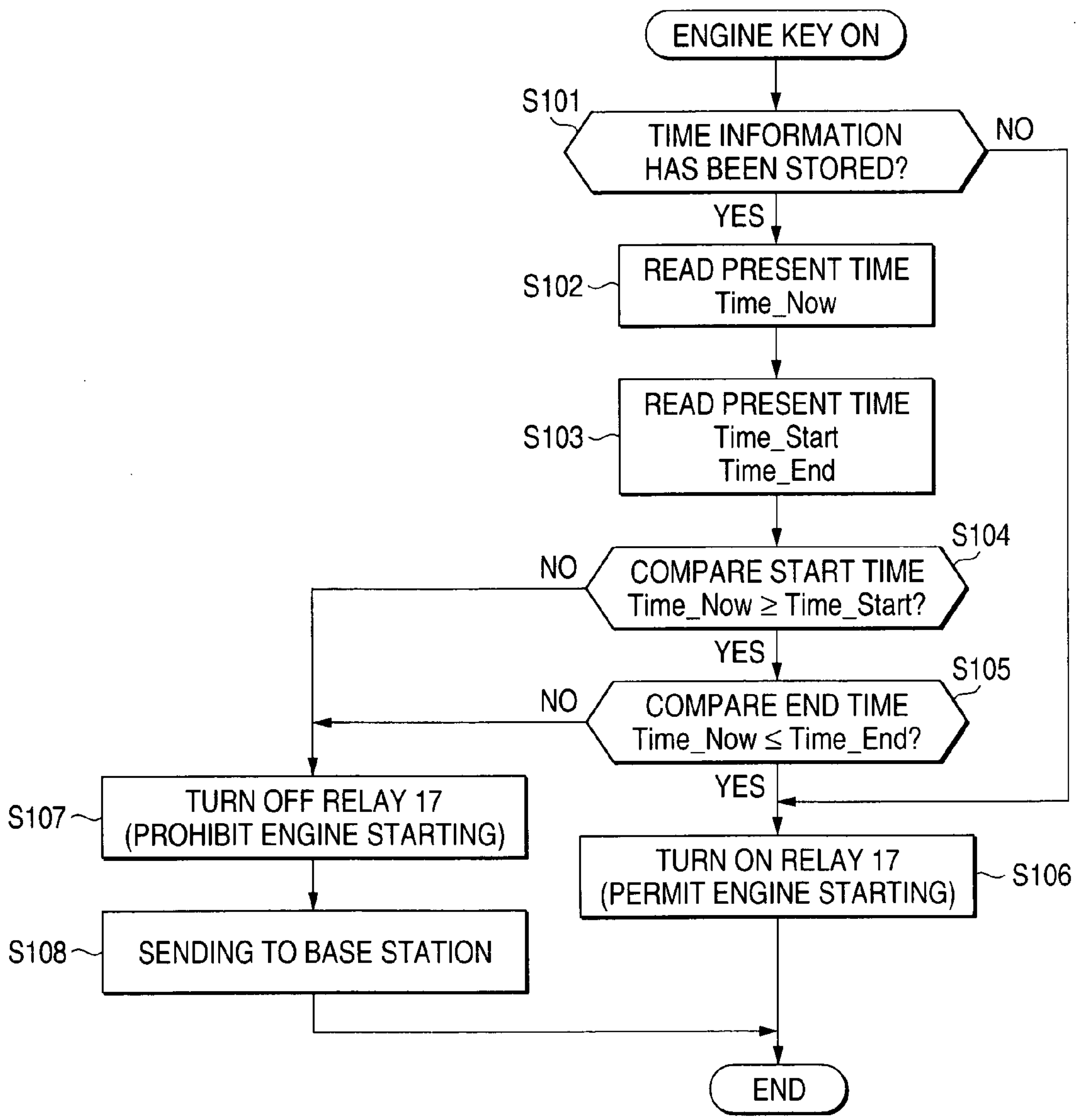
FIG. 9 is a flowchart showing one example of theft prevention control performed by a main control unit of the oil hydraulic shovel.

FIG. 9 shows theft prevention processing by the main control unit 211 of the oil hydraulic shovel 210.

When the engine key switch 216 is turned on, this program is activated and it is first determined whether or not the work start time Time_Start and the work end time Time_End described above have already been stored in the memory 211A (step S101). When they have not been stored, the relay 217 is turned on and starting of the engine 214 is permitted (step S106). In this case, the engine 214 is started with ON of the starter switch 216.

On the other hand, when the work start time Time_Start and the work end time Time_End have been stored, the present time Time_Now is read from the GPS control unit 213 (step S102). Also, the work start time Time_Start and the work end time Time_End are read from the memory 211A (step S103).

Steps S104 and S105 are a step for determining whether or not the present time Time_Now is within the operable time zone of the oil hydraulic shovel 210. In the case of Time_Now≧Time_Start and Time_Now≦Time_End, it is decided that the present is within the operable time zone, and the relay 217 is turned on and starting of the engine 214 is permitted (step S106).

On the other hand, in the case of Time_Now<Time_Start or the case of Time_Now>Time_End, it is decided that the present is beyond the operable time zone (inoperable time zone), and the relay 217 is turned off (step S107). In this case, even when the key switch 216 is turned on, the starter motor 215 is not driven, so that the engine 214 is not started. Subsequently, an engine starting operation of the oil hydraulic shovel 210 is performed beyond the operable time zone, so that information to the effect that there is a possibility of theft of the oil hydraulic shovel 210 is sent from the control unit 212 for communication toward the base station 240 (step S108).

In the present embodiment as described above, when a user reports information about an operable time zone of the oil hydraulic shovel 210 of my company from the communication device 250 to the base station 240, the base station 240 sends the information about the operable time zone to the oil hydraulic shovel 210 held by its user. When the engine key switch 216 is turned on in the oil hydraulic shovel 210, it is determined whether or not the present time (time at which the key switch 216 is turned on) is within the operable time zone and when it is beyond the operable time zone, it is decided that there is a possibility of theft, and starting of the engine 214 is prohibited and also the base station 240 is notified of its possibility of theft. As a result of this, the oil hydraulic shovel 210 can be prevented from being stolen in an inoperable time zone such as night or early morning. In this method, it is quite unnecessary for an operator to input a personal identification number or insert an IC card every time the engine 214 is started, and the operator has only to operate the key switch 216 merely.

Here, the determination as to whether or not it is within the operable time zone and processing by its determination result are performed strictly when the key switch 216 is turned on, and in the case of deviating from the operable time zone (the case of exceeding Time_End) during engine operation (permitted travel), the relay 217 is not turned off. Therefore, in this case, work can be done continuously even when exceeding the operable time zone.

Figure 10:
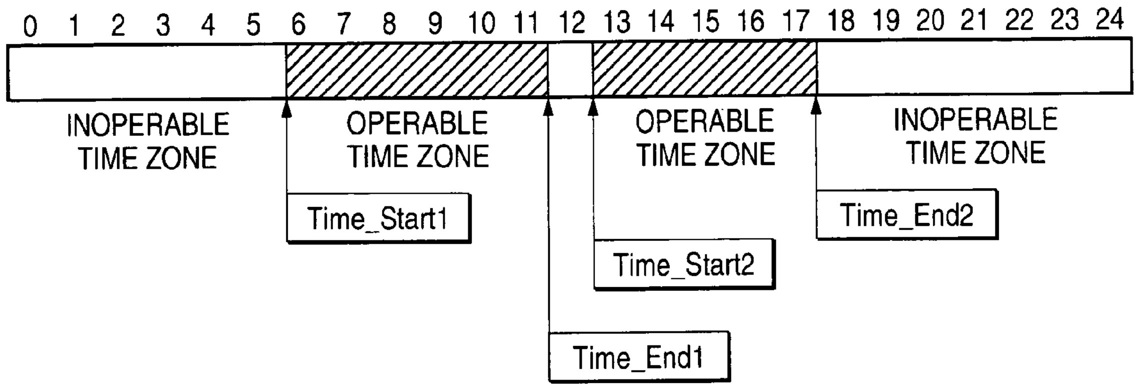
FIG. 10 is a diagram showing another example of operable time zone setting.

In the example of FIG. 8 described above, a time zone capable of setting in one day is only one, but it may be configured so that two or more time zone settings in one day can be made. For example, FIG. 10 shows an example capable of making two time zone settings in which a lunch break is sandwiched. That is, since a work site may become unattended at a lunch break as well as night or early morning, the lunch break is set to an inoperable time zone to achieve theft prevention. Also, by setting non-working day to an inoperable time zone all day, theft of the oil hydraulic shovel 210 on the non-working day can be prevented.

Figure 11:
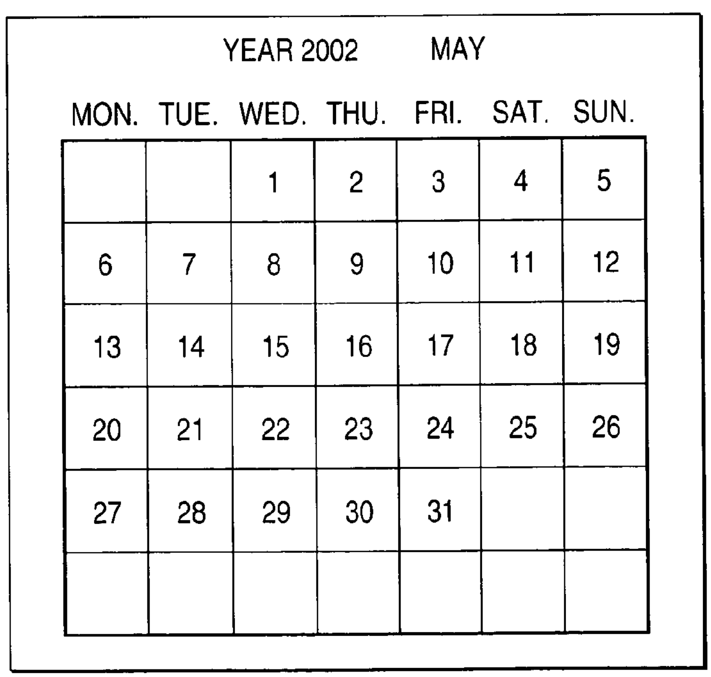
FIG. 11 is a diagram showing one example of operable time zone setting.

Also, in the above description, the example of setting an operable time zone in one day is shown, but it may be configured so as to set an operable period in one month. That is, a user uses the communication device 250, and makes access to a Web site of the base station 240 in a manner similar to the above description, and displays an operating period setting page. In this page, for example, a calendar as shown in FIG. 11 is displayed and an operator clicks the work start date and the work end date and thereby, and the center server 241 recognizes both of the dates and sends their dates toward the oil hydraulic shovel 210. In the oil hydraulic shovel 210, the work start date and the work end date of itself are set based on its sent information. In this case, a period from the work start date to the work end date becomes an operable period and the other period becomes an inoperable period. Then, in a manner similar to the above description, when the engine key switch 216 is turned on, it is determined whether or not today is within the operable period and when it is not within the operable period, starting of the engine 214 is prohibited. This processing can be performed simply by only changing a flowchart of FIG. 9 properly.

Also, both of the operable period and the operable time zone can be set. That is, it may be configured so that starting of the engine 214 is prohibited when time at which the key switch 216 is turned on is beyond the operable time zone even in the case that today is within the operable period.

Incidentally, it is configured so as to acquire the present time or date using the GPS satellite 220, but it may be configured so as to acquire the present time or date from a clock mechanism or a date mechanism held by the oil hydraulic shovel itself. Also, the example of prohibiting the starting of the engine 214 by turning off the starter relay 217 in the case of being beyond the operable time zone or the operable period is shown, but it may be configured so that the oil hydraulic shovel 210 cannot travel by breaking a pilot oil hydraulic circuit as described in, for example, JP-A-9-50584. Specifically, it may be configured so that a switching valve (for example, an electromagnetic valve) is provided in a discharge circuit of each pilot oil hydraulic pump and in the case of being beyond an operable time zone or an operable period, the switching valve is set in a breaking position and in the other case, the switching valve is switched in a communication position. In the case that the switching valve is in the breaking position, even when each operation member is operated, each attachment or an actuator for swing as well as an oil hydraulic motor for travel are not driven, so that theft prevention can be achieved thereby.

Further, it may be configured such that setting of the time zone or the period by a user to setting of the time zone (period) in the oil hydraulic shovel 210 are made automatically, or it may be configured so that when a user notifies the base station 240 of the time zone (period) by the phone or mail, etc., an operator of the maker side performs sending to the oil hydraulic shovel 210 accordingly and on receipt of it, the oil hydraulic shovel 210 makes setting of the time zone (period).

Or, it may be configured so that rather than sending information from the base station 240, an operator of the oil hydraulic shovel 210 or a serviceman of the base station 240 connects an external device (for example, a mobile type personal computer) to the main control unit 211 of the oil hydraulic shovel 210 and inputs the time or date for determining the time zone (period) The external device may be a portable phone and it may be configured so as to input the time or date using operation keys of the portable phone. It can cope with these inputs by the external device by embedding dedicated software in the external device.

Also, the theft prevention of the oil hydraulic shovel has been described, but the present invention can be applied similarly to theft prevention of construction machines (for example, a crane) other than the oil hydraulic shovel.

Third Embodiment

Figure 14:
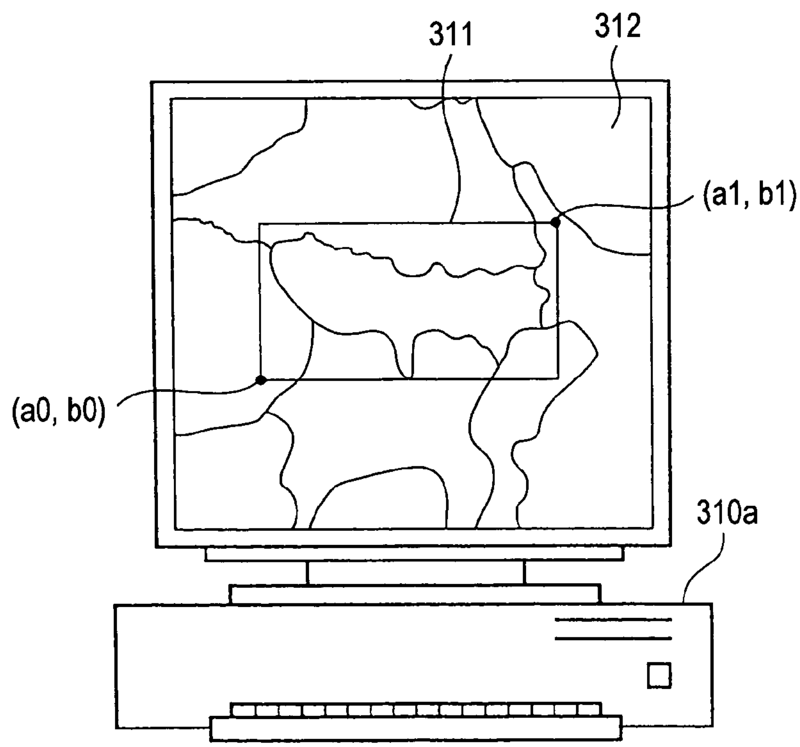
FIG. 14 is an explanatory diagram of operating area setting.
Figure 15:
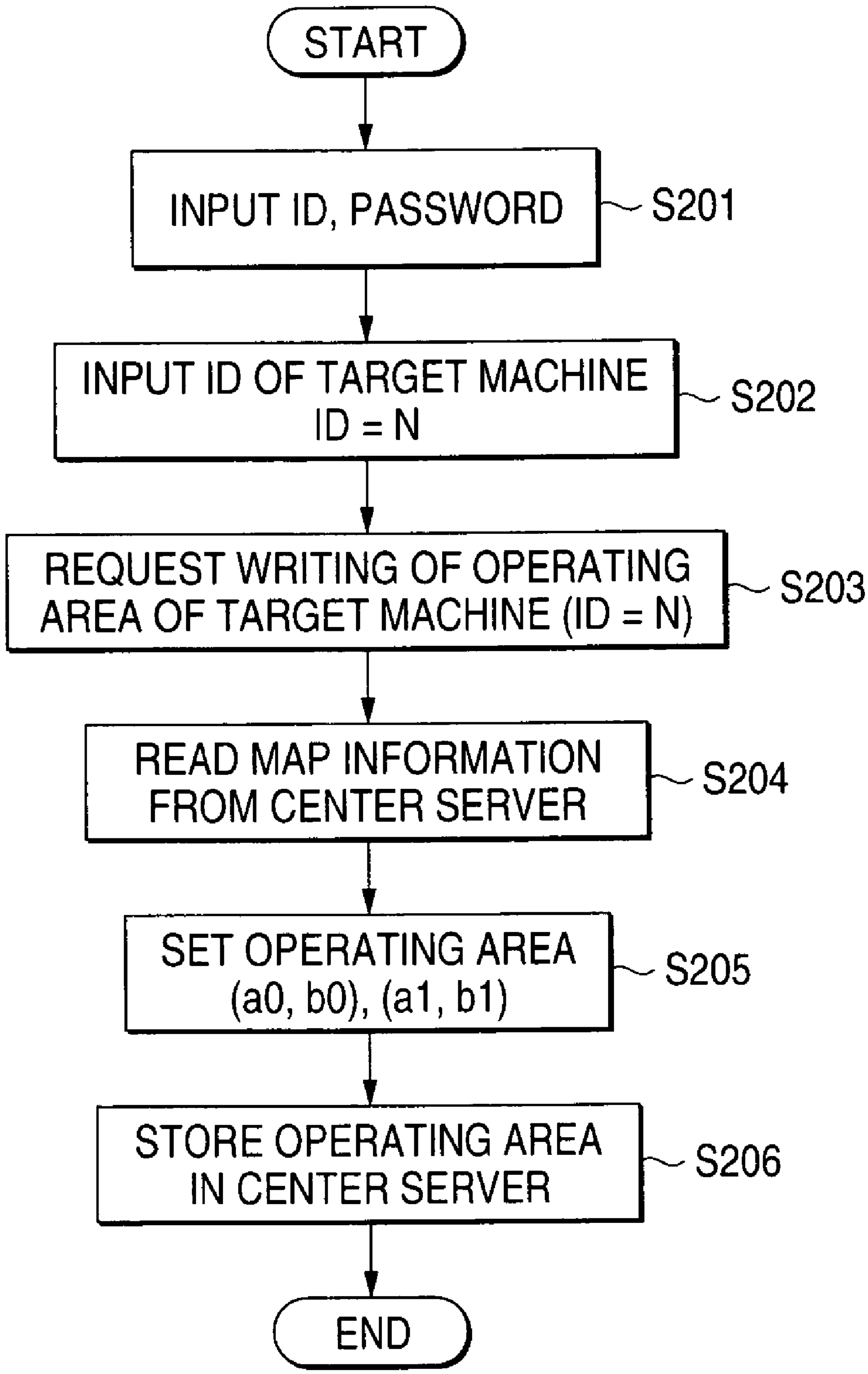
FIG. 15 is a flowchart showing processing in a personal computer owned by a user in the case of the operating area setting.
Figure 16:
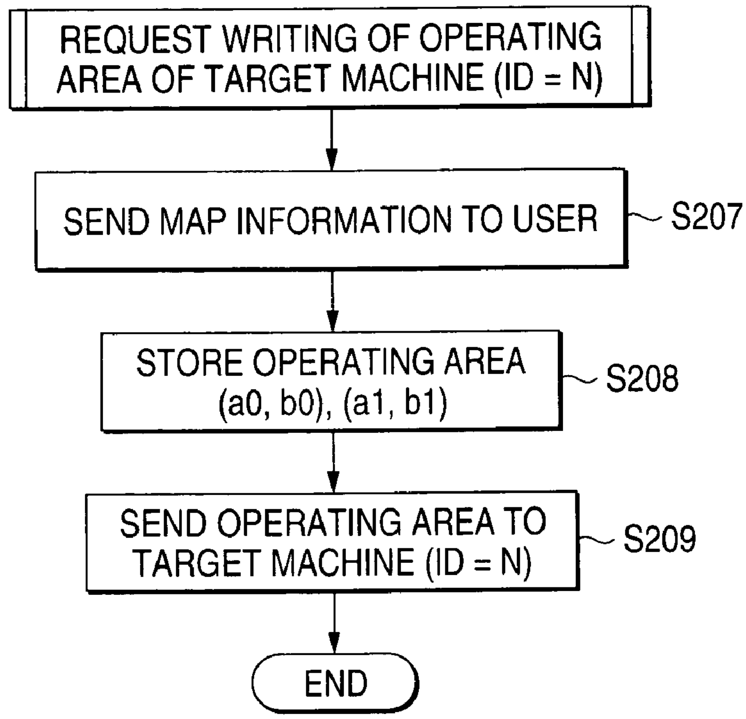
FIG. 16 is a flowchart of processing performed by a server acting as a base station in the case of the operating area setting.
Figure 17:
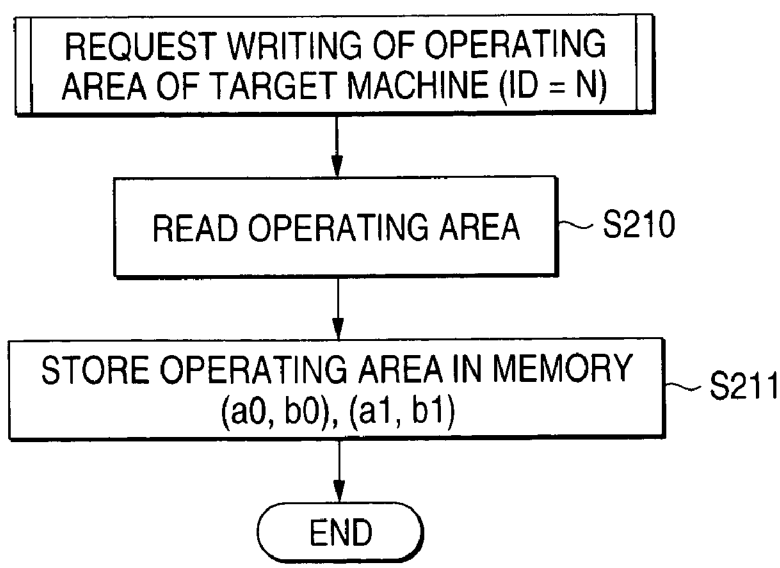
FIG. 17 is a flowchart of processing performed by a control apparatus in the case of the operating area setting.
Figure 18:
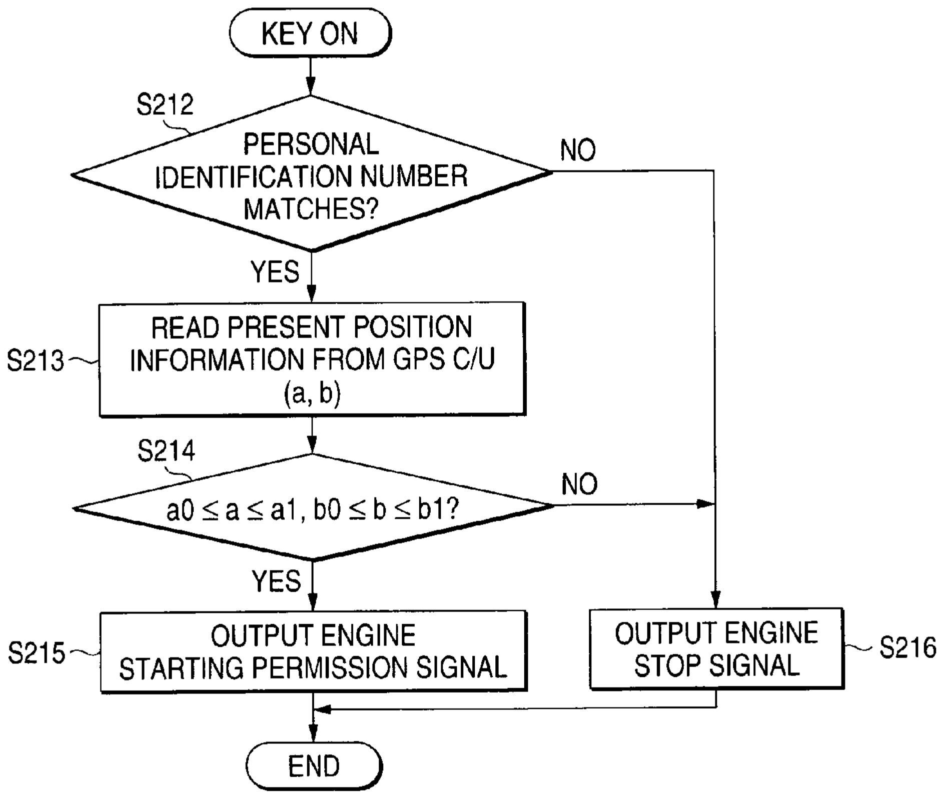
FIG. 18 is a flowchart of processing performed in the control apparatus in the case of operating a key switch for starting an engine.

Theft prevention method and system of a construction machine in a third embodiment of the present invention will be described below based on FIGS. 12 to 23. In the present embodiment, an oil hydraulic shovel is applied to a target as a construction machine, and FIG. 12 is the whole configuration diagram of a theft prevention system, and FIG. 13 is a diagram showing a configuration of a control apparatus 302 provided in an oil hydraulic shovel 301, and FIG. 14 is an explanatory diagram of operating area setting by a user 310 who is an owner of the oil hydraulic shovel 301, and FIG. 15 is a flowchart of processing in a personal computer 310*a* acting as a terminal device owned by the user 310 in the case of the operating area setting, and FIG. 16 is a flowchart of processing performed by abase station 306 in the case of the operating area setting, and FIG. 17 is a flowchart of processing performed by the control apparatus 302 of the oil hydraulic shovel 301 in the case of the operating area setting, and FIG. 18 is a flowchart of processing performed in the control apparatus in the case of operating a key switch for starting an engine of the oil hydraulic shovel 301, and FIG. 19 is a diagram showing a relation between the control apparatus 302 provided in the oil hydraulic shovel 301 and an engine starting circuit.

Figure 12:
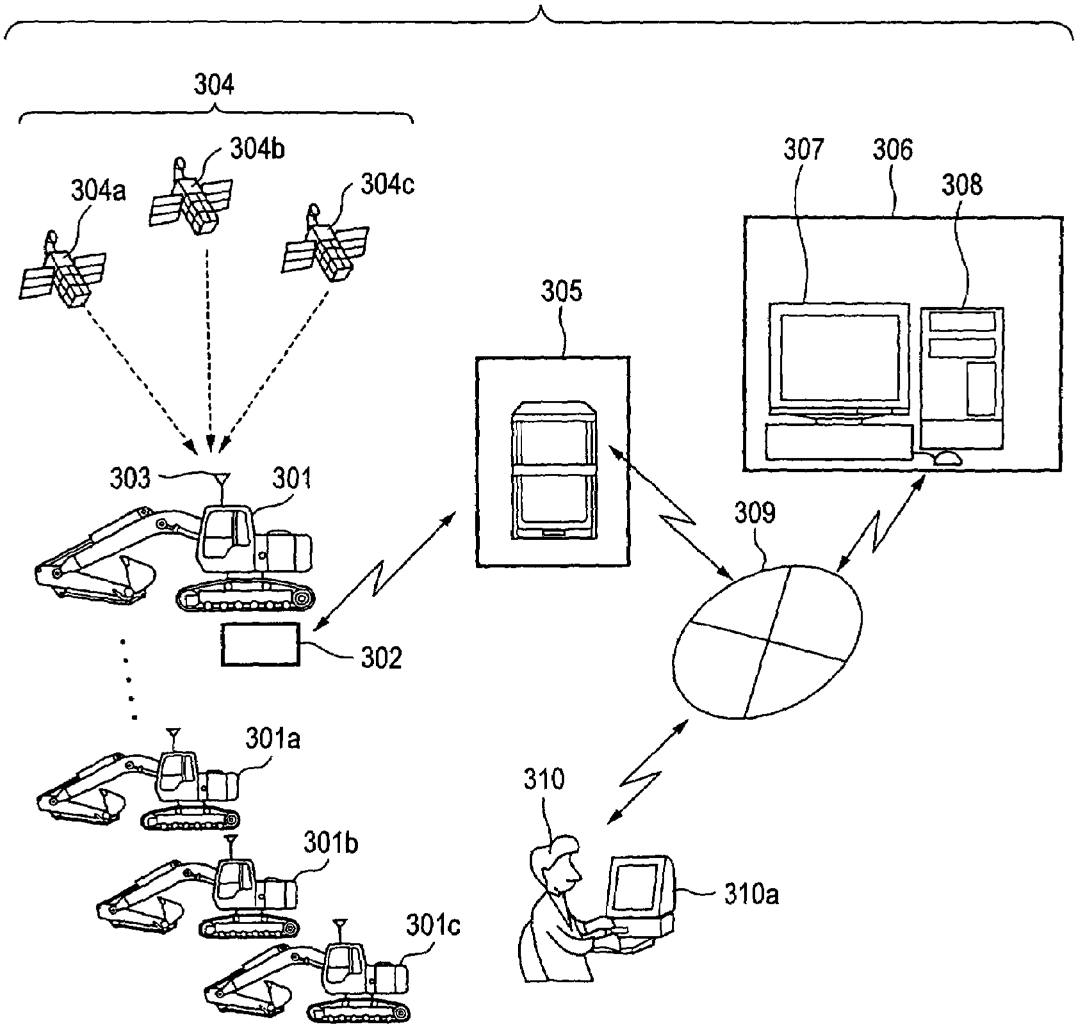
FIG. 12 is the whole configuration diagram of a form of a theft prevention system in a third embodiment of the present invention.
Figure 13:
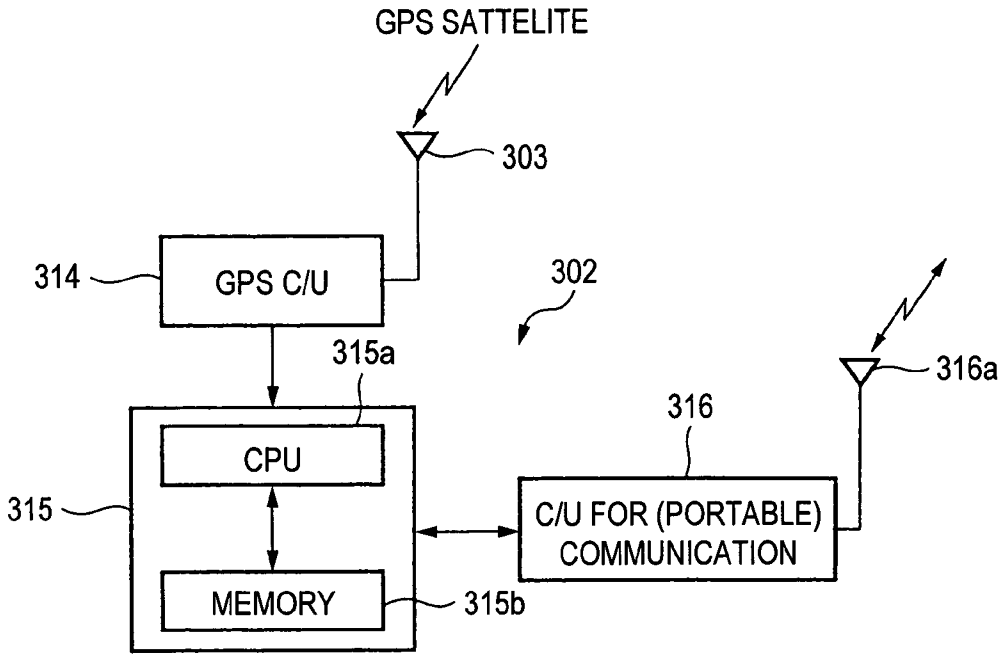
FIG. 13 is a diagram showing a configuration of a control apparatus 302 in the third embodiment of the present invention.

As shown in FIGS. 12 and 13, the oil hydraulic shovel 301 acting as the construction machine to which the present embodiment is applied comprises an antenna 303 for receiving signals from three GPS satellites 304*a*, 304*b*, 304*c*, a GPS control unit 314 for calculating the present position based on the signals received by this antenna 303, a control unit 316 for communication for communicating with a server 307 owned by a base station 306 of, for example, a maker etc. of the oil hydraulic shovel 301 as a base station or a personal computer 310*a* of a user 310 who is an owner of the oil hydraulic shovel 301, and a vehicle-mounted controller 315 for performing predetermined processing based on giving and receiving of a signal to the control unit 316 for communication while inputting position information calculated from the GPS control unit 314.

Figure 19:
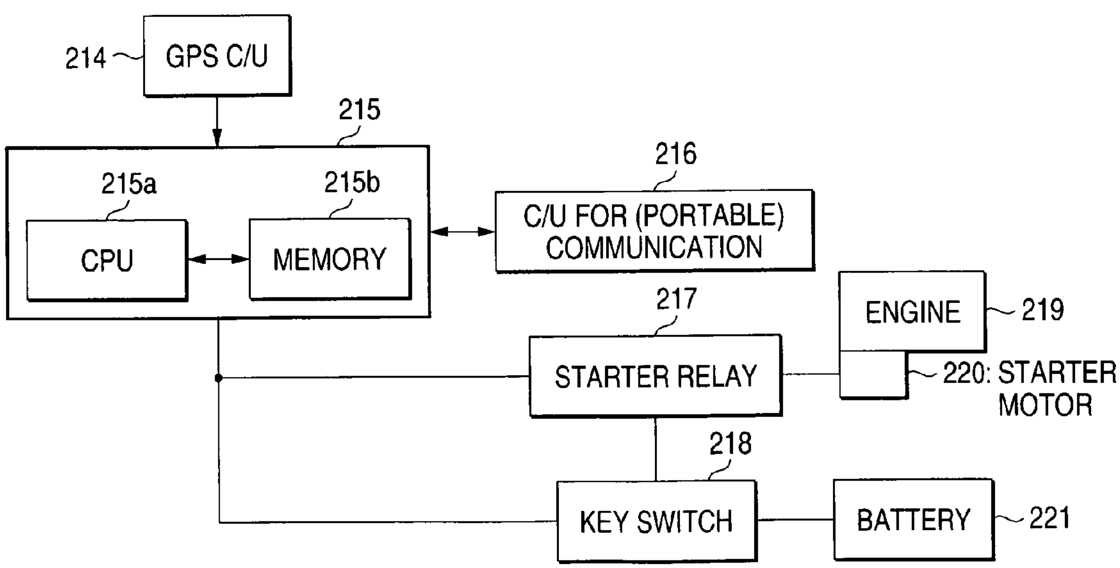
FIG. 19 is a diagram showing a relation between the control apparatus and an engine starting circuit.

Further, as shown in FIG. 19, a signal outputted from the vehicle-mounted controller 315 switches a starter relay 317 of an engine 319. The starter relay 317 is interposed between a starter motor 320 of the engine 319 and a key switch 318 for starting of the engine 319, and when the relay 317 is ON, the starter motor 320 is driven with an operation of the key switch 318. Incidentally, numeral 321 is a battery connected to the key switch 318. Incidentally, as shown in FIG. 12, oil hydraulic shovels 301*a*, 301*b*, 301*c* other than the oil hydraulic shovel 301 also have similar configurations.

Also, in the present embodiment, a communication line for portable phone which is a ground wave is used as means of communication with the outside. Also, for conveniece in description, combination of the vehicle-mounted controller 315 and the control unit 316 for communication is referred to as a control apparatus 302. Information is mutually sent and received between the oil hydraulic shovel 301 and the base station 306 or the user 310 located at a remote site through a management station 305 for managing the communication line for portable phone and a public line, for example, the Internet 309. Further, communication is also conducted between the server 307 and the personal computer 310*a* of the user 310 through the Internet 309. Incidentally, numeral 308 is a data base which is connected to the server 307 and accumulates information sent from the oil hydraulic shovel 301 or information from the user 310 and accumulates information to be provided to the user 310. Also, numeral 316*a* is an antenna for sending and receiving a ground wave signal for portable phone.

In the theft prevention method and system of the construction machine according to the present embodiment configured as described above, when the user 310 sets an operable area of the oil hydraulic shovel 301 by the personal computer 310*a*, this set operating area is sent to the oil hydraulic shovel 301 through the server 307, the Internet 309, the management station 305 and is received by the antenna 316*a* and is stored in memory 315*b* provided inside the vehicle-mounted controller 315 through the control unit 316 for communication. A series of this processing will be described using FIGS. 14 to 17.

Figure 23:
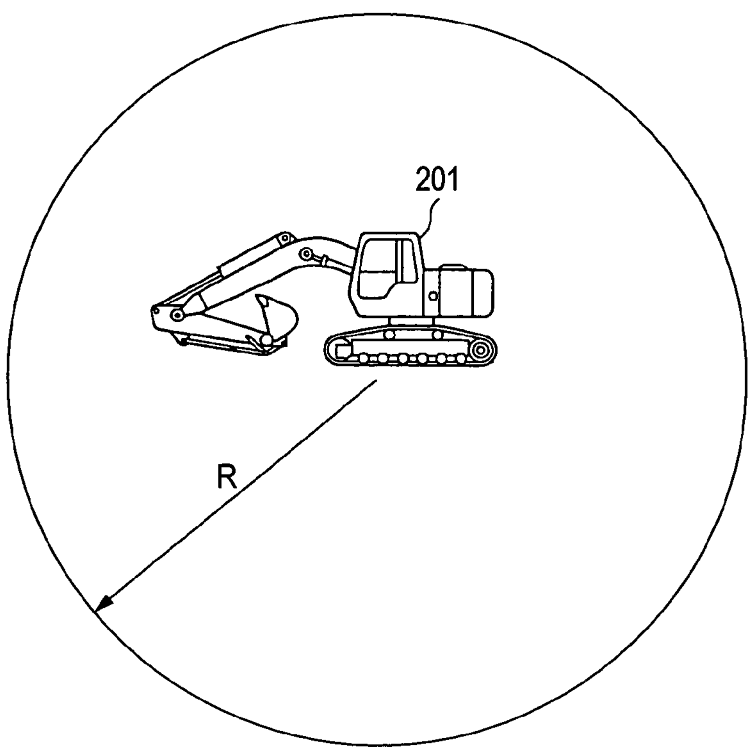
FIG. 23 is an explanatory diagram of conventional operating area setting.

First, the user 310 makes access to the server 307 by the personal computer 310*a*. In this case, access can be made to the server 307 by inputting an ID number and a password of the user 310 as shown in step S201 of FIG. 15. In the next step S202, an ID number (N) of a target machine is inputted in order to identify the oil hydraulic shovel 301 of a target of setting an operable area. In step S203, rewriting of the operating area of the target machine is requested from the server 307. When the server 307 receives the rewriting request of the operating area with respect to the target machine (ID=N), map information is sent to the personal computer 310*a* (of the user 310) as shown in step S207 of FIG. 16. When the personal computer 310*a* receives the map information from the server 307, this map information is read as shown in step S204 of FIG. 15 and the read map information is displayed on a CRT screen of the personal computer 310 as shown in FIG. 14. This map information shown in FIG. 14 is map information in which a portion of the Kanto region is enlarged and displayed and, for example, is divided into sections every prefecture. Then, in step S205, the operating area is automatically set by selecting any of the divided prefectures. In a conventional example, it is configured so as to display a circle with a radius R about a location of the construction machine as shown in FIG. 23, but in the present embodiment, for example, when the Metropolis of Tokyo is selected and set, an area surrounded by a quadrilateral cursor 311 wider than an actual area of the Metropolis of Tokyo is set as shown in FIG. 14. That is, it becomes an area surrounded by latitude (a0–a1) and longitude (b0–b1) as shown in FIG. 14. Then, when the operating area is determined in step S206, in the server 307, this set operating area is associated with the ID number of the target machine and is stored in the database 308 as shown in step S208 of FIG. 16. Then, as shown in step S209, the server 307 sends information (a0, b0), (a1, b1) about this determined operating area to the target machine (ID=N: in this case, the oil hydraulic shovel 301).

When the target machine receives an operating area rewriting request, information (a0, b0), (a1, b1) about the operating area received from the server 307 is read as shown in step S210 of FIG. 17 and is stored in the memory 315*b* of the vehicle-mounted controller 315 by the next step S211.

Next, processing for theft prevention after setting the operating area (a0, b0), (a1, b1) will be described by FIGS. 18 and 19.

In the case of starting the engine 319 of the oil hydraulic shovel 301, an identification number, for example, a personal identification number allocated to the oil hydraulic shovel 301 is inputted. Then, when the key switch 318 of the engine 319 is operated, as shown in step S212 of FIG. 18, it is decided whether or not this personal identification number matches with a personal identification number allocated previously and when it is decided that it matches, the processing proceeds to the next step S213. In step S213, the present position information about the oil hydraulic shovel 301 is read from the GPS control unit 314. In the next step S214, the position information read from the GPS control unit 314 and information about the operating area stored in the memory 315*b* are read and it is compared whether or not the position information (a, b) is within the operating area (a0, b0), (a1, b1). As a result of the comparison, when it is decided that the oil hydraulic shovel 301 is present within the operating area, it proceeds to the next step S215 and an engine starting permission signal is outputted from the vehicle-mounted controller 315 to the starter relay 317. On the other hand, when it is decided that the personal identification number does not match in step S212 or it is decided that the present position of the oil hydraulic shovel 301 is beyond the operating area in step S215, it proceeds to step S216 and a stop signal of the engine 319 is outputted from the vehicle-mounted controller 315 to the starter relay 317.

The engine starting permission signal or the engine stop signal outputted from the vehicle-mounted controller 315 switches the starter relay 317 as shown in FIG. 19. As a result of this, starting of the engine 319 is controlled.

Figure 20:
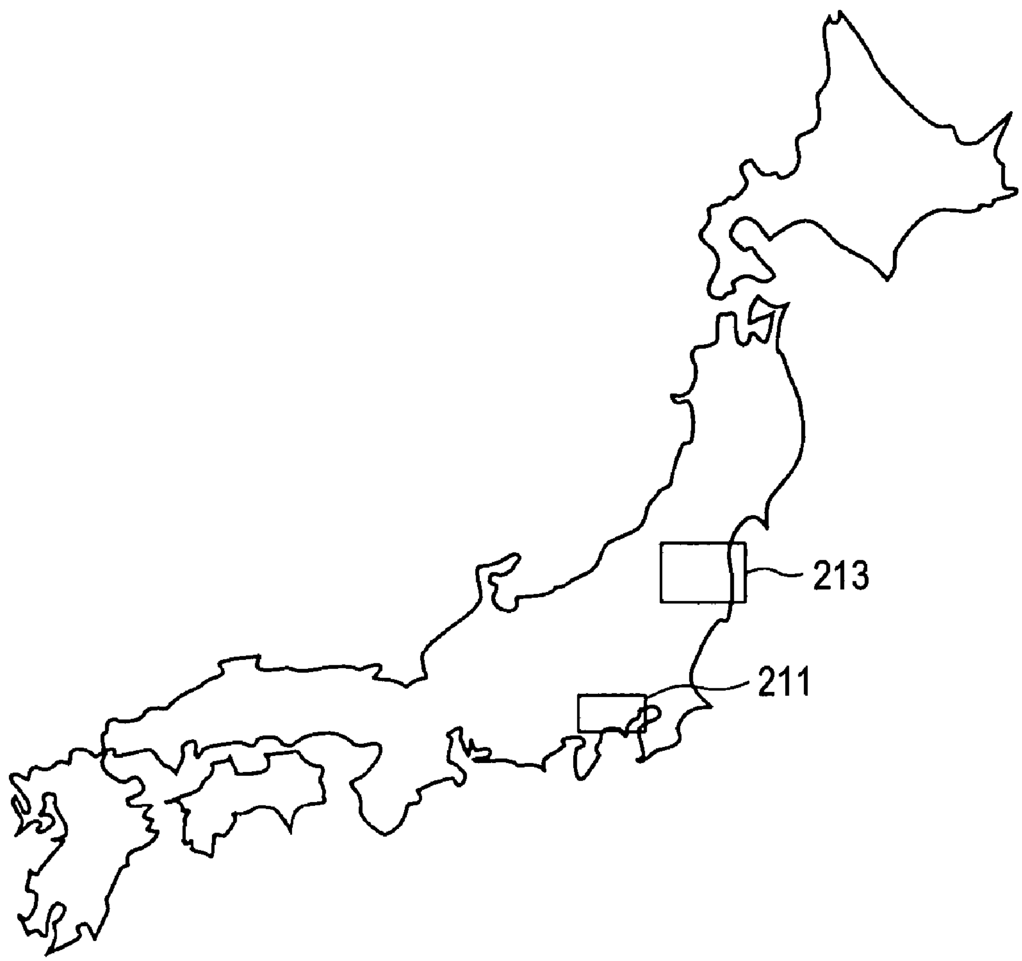
FIG. 20 is an explanatory diagram of operating area setting.

Incidentally, as described above, in the present embodiment, areas respectively wider with respect to the divided sections, for example, prefectures are set. This is because, for example, in the case of doing work in the vicinity of the border between the Metropolis of Tokyo and Saitama Prefecture, it is assumed that the oil hydraulic shovel 301 moves out of the operating area by travel when too close setting is made. Also, as shown in FIG. 20, for example, two places of the Metropolis of Tokyo and Fukushima Prefecture can be set as operating areas. This is provided because it takes time and effort to reset the operating area every movement in the case that work is scheduled in the two places of the Metropolis of Tokyo and Fukushima Prefecture within a certain period. In the case that only one place can be set, when setting at the next work site is forgot, a disadvantage that the oil hydraulic shovel 301 cannot be operated, etc. occurs. On the contrary, such a disadvantage is eliminated by setting plural places.

Figure 22:
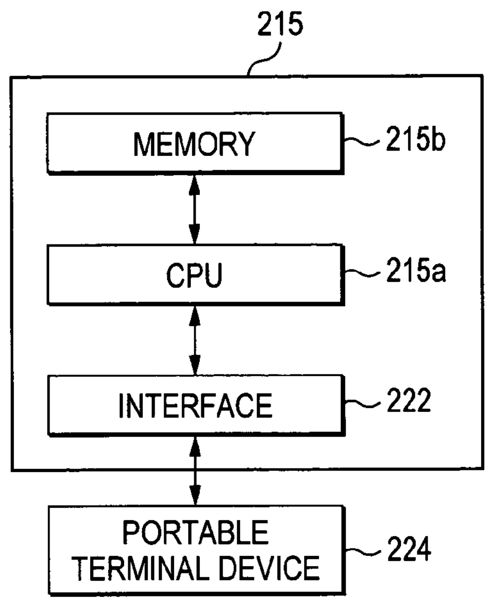
FIG. 22 is a main configuration diagram of the case of setting an operating area using a portable terminal device.

Incidentally, the portable phone itself may be used as the control unit 316 for communication of the oil hydraulic shovel 301 described above. In this case, as shown in FIG. 22, connection to the vehicle-mounted controller 315 may be made through an interface 322 for input/output, or communication with the vehicle-mounted controller 315 may be conducted by an infrared signal.

Figure 21:
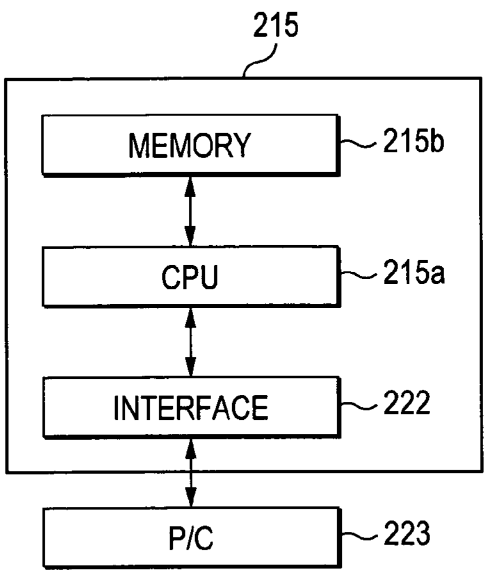
FIG. 21 is a main configuration diagram of the case of setting an operating area from a portable personal computer.

Also, as shown in FIG. 21, a portable personal computer 323 etc. in which an operating area is preset may be carried into an operating site of the oil hydraulic shovel 301 to directly write information about the operating area in the memory 315*b* through the interface 322.

Further, in the embodiment described above, it is configured so that the vehicle-mounted controller 315 automatically outputs the stop signal of the engine 319 to the starter relay 317 when the present position of the oil hydraulic shovel 301 is beyond the operating area, but it may be configured so that the fact that it is beyond the operating area is once sent to the side of the user 310 and it is decided whether or not starting of the engine 319 is prohibited in the side of the user 310 and its result is sent to the vehicle-mounted controller 315. Incidentally, also in this case, there in no difference in that a decision as to whether or not the oil hydraulic shovel 301 is within the operating area is made in the side of the oil hydraulic shovel 301.

As described above, according to the third embodiment based on the present invention, all of the comparison between the operating area (a0, b0), (a1, b1) preset by the user 310 and the present position (a, b) and the decision as to whether or not to operate based on this comparison result, etc. are made by the vehicle-mounted control unit 315 provided in the oil hydraulic shovel 301, so that it is unnecessary to send position information to the server 307 or the user 310 every time starting of the engine 319 is operated once the operating area is set in the memory 315*b*. Therefore, an influence of environment of noise etc. in the periphery of a site at which the oil hydraulic shovel 301 is located is little suffered, and also communication cost can be reduced as low as possible since the number of communications decreases. Also, when only setting of the operating area is made, processing for theft prevention can be performed in the side of the oil hydraulic shovel 301, so that a ground wave for portable phone can be used even in the case of doing work at a site such as a mountain region. Including this point too, the communication cost can be reduced remarkably than communication through a communication satellite.

Also, the user 310 can make setting easily by selecting an operating area from among plural sections stored in the server 307. Further, this set operating area is sent to the oil hydraulic shovel 301 via the server 307 and is stored in the memory 315*b* of the vehicle-mounted controller 315, so that the operating area can be set easily and also this set operating area can be transferred easily to the oil hydraulic shovel 301.

Fourth Embodiment

A fourth embodiment of the present invention will be described below based on FIGS. 24 to 32.

A configuration described in the embodiment is merely illustrated to the extent to which the present invention can be understood and implemented. Therefore, the present invention is not limited to the embodiment described below, and can be changed to various forms without departing from the scope of a technical idea shown in claims.

Figure 24:
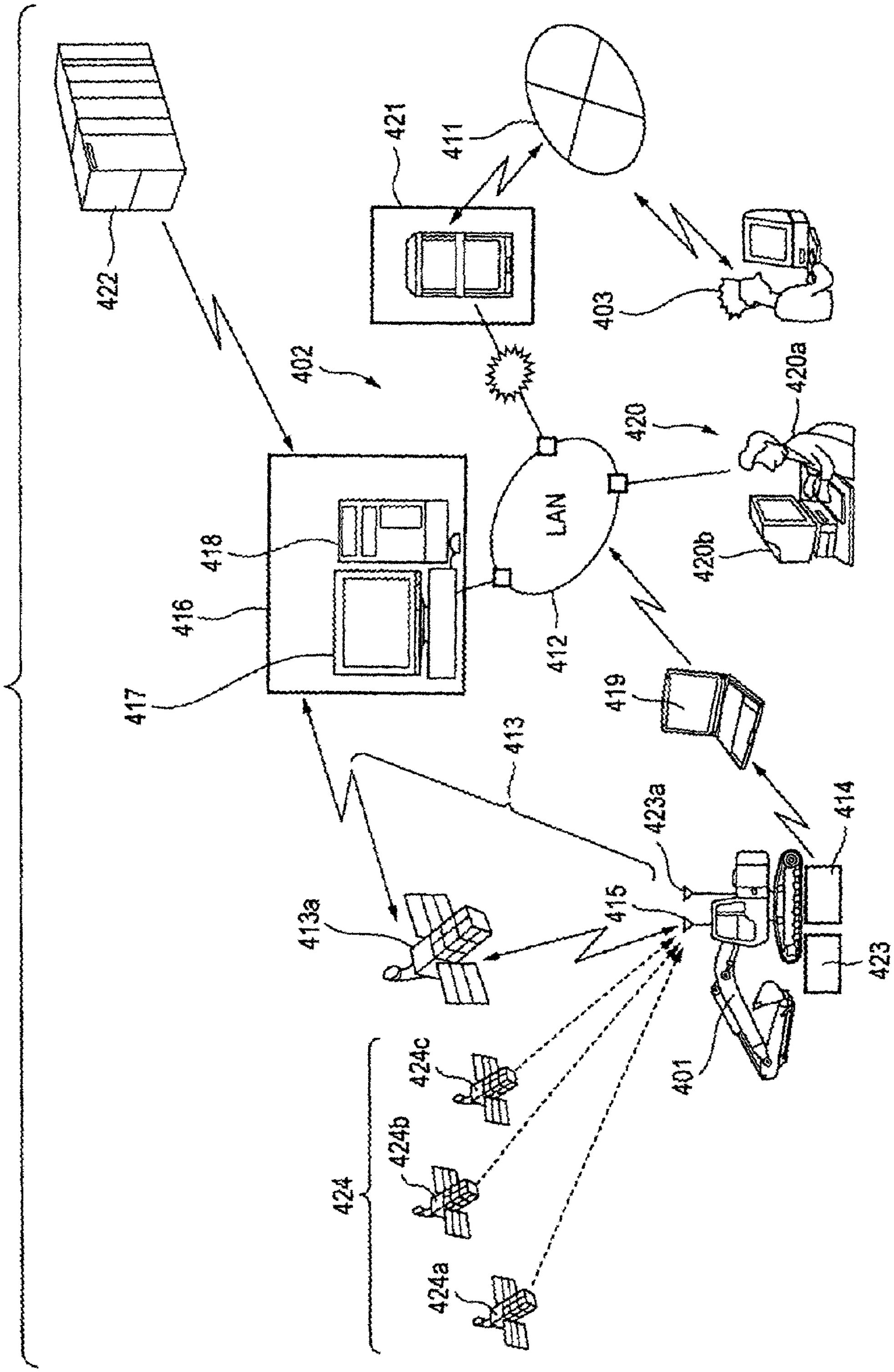
FIG. 24 is a diagram schematically showing the whole configuration of a peripheral system including a construction machine to which a theft prevention method according to the present invention is applied.

FIG. 24 schematically shows the whole configuration of a peripheral system including a construction machine to which a theft prevention method according to the present invention is applied. In a construction machine of the present embodiment and a system including this construction machine, the theft prevention method according to the present invention is implemented. In the present embodiment, an example of an oil hydraulic shovel 401 is shown as a construction machine, and a maker 402 for manufacturing and selling the oil hydraulic shovel 401 and a user 403 for using the oil hydraulic shovel 401 are shown as elements forming said system. In this system, the oil hydraulic shovel 401 is normally arranged at a work site or near to the work site. The maker 402 or the user 403 resides in a position spatially or geographically remote from this oil hydraulic shovel 401. Incidentally, the construction machine is not limited to the oil hydraulic shovel.

In the system described above, in order to make connections among the oil hydraulic shovel 401, the maker 402 and the user 403, IT (information technology) is utilized and an Internet network 411, an intra-company LAN 412 and a communication line 413 using a communication satellite 413*a* are provided and further a GPS satellite system 424 using orbit satellites 424*a*, 424*b*, 424*c* for measuring a position of the oil hydraulic shovel 401 is provided. The oil hydraulic shovel 401 is equipped with a control apparatus 414 formed of a computer, a GPS device 423 including an antenna 423*a* for GPS, and a communication device 442 including an antenna 415 for communication.

Figure 25:
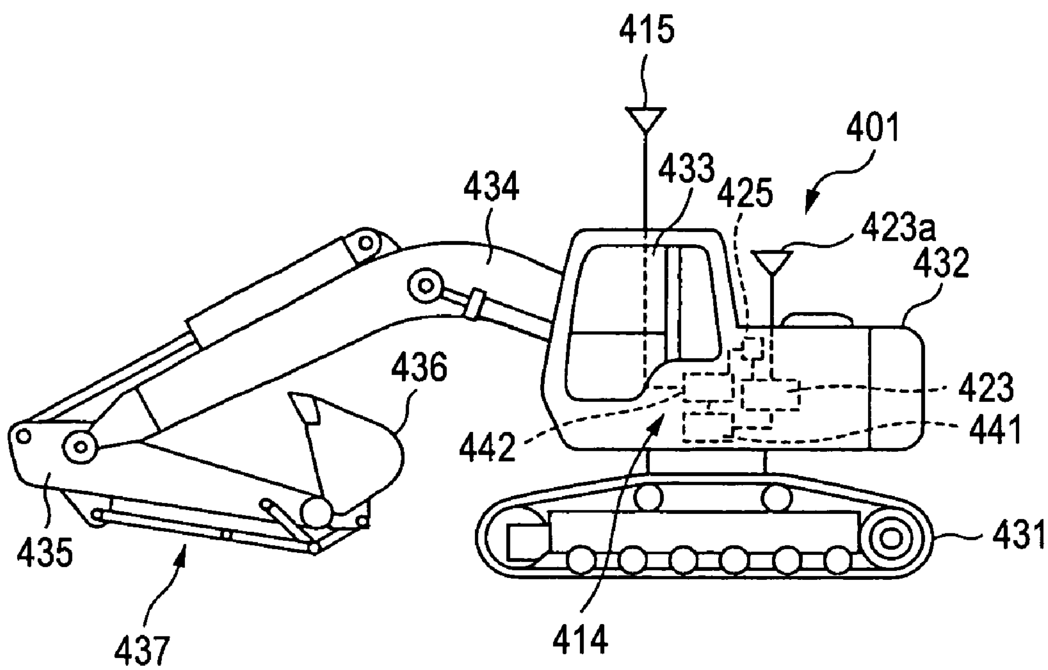
FIG. 25 is a side view showing an oil hydraulic shovel as one example of a construction machine to which a theft prevention method according to the present invention is applied.

In a configuration of the present embodiment, the communication device 442 is included in the control apparatus 414 as shown in FIG. 25. In the maker 402, a base station 416 is provided and a management server (or center server) 417 and a database 418 are placed in this base station 416. Connection between the control apparatus 414 of the oil hydraulic shovel 401 placed at a work site and the base station 416 of the maker 402 is made so that necessary information (data) can be sent and received regularly or irregularly via the intra-company LAN 412 using a notebook personal computer 419 used by a serviceman or via the communication line 413 using the communication satellite 413*a*.

All of the information such as operating information or position information occurring in the oil hydraulic shovel 401 is sent to the management server 417 of the base station 416 and is processed and stored herein. With respect to the information sent from the oil hydraulic shovel 401, the management server 417 sends information about a command or data as necessary. Data such as an operating state, a setting state and position information about the oil hydraulic shovel 401 is stored in the database 418 and is managed.

The maker 402 is connected to a branch office 420 through the intra-company LAN 412. Therefore, a salesman or a serviceman 420*a* in the branch office 420 can make access to the management server 417 and the database 418 using an input terminal 420*b* placed therein, and can utilize failure diagnosis or quality assurance information by retrieving and fetching data necessary for the job. Also, the maker 402 is provided with an outside server 421 connected to the intra-company LAN 412. Using this outside server 421, necessary information is posted to the user 403 via the Internet network 411 and various proposals can be made with respect to a use method and maintenance of the oil hydraulic shovel. Incidentally, the management server 417 of the base station 416 is connected to a computer 422 for storing test data (repair and inspection information or part replacement information) provided separately. Data stored in the computer 422 is also downloaded to the management server 417 properly and is stored in the database 418 thereof.

Also, the oil hydraulic shovel 401 is equipped with the GPS device 423. This GPS device 423 is a position measuring device, and receives signals given from at least three orbit satellites 424*a*, 424*b*, 424*c* of the GPS satellite system 424, and measures the present position of the oil hydraulic shovel 401 using said signals. Measurement of this present position is made at proper time intervals required.

Present position data of the oil hydraulic shovel 401 measured at the time intervals set based on the GPS device 423 is transmitted to the control apparatus 414, and is stored in memory built into the control apparatus 414 along with measured time and date data. Further, using a data processing function and a communication function of the control apparatus 414 and the communication line 413, the control apparatus 414 sends data of the present position and the measured time and date to the management server 417 of the base station 416 with set sending timing.

A side view of the oil hydraulic shovel 401 is shown in FIG. 25. The oil hydraulic shovel 401 comprises a lower travel body 431 for traveling by an oil hydraulic motor, an upper swing body 432 in which an engine, an oil hydraulic pump, oil hydraulic piping, a power source battery, a driving cab 433, etc. are placed, and a front mechanism portion 437 including a boom 434, an arm 435 and a bucket 436. The bucket 436 is a work performance mechanism portion, and is a portion replaced and changed freely according to work in a user. This oil hydraulic shovel 401 comprises the control apparatus 414 and an antenna 415 for communication, and the GPS device 423 and an antenna 423*a* for GPS in a place of, for example, the driving cab 433. The control apparatus 414 comprises a main controller 441 and the communication device 442. The GPS device 423 is connected to the main controller 441.

The GPS device 423 and the communication device 442 are connected to an action stop control portion 425. In the case of receiving a signal from the GPS device 423 or the communication device 442, the action stop control portion 425 breaks a current-carrying system or a fuel supply system or an oil hydraulic system, and stops an action of the oil hydraulic shovel 401.

Incidentally, the oil hydraulic shovel 401 shown in FIGS. 24 and 25 is arranged at each of many work sites actually under management based on the management server 417 and many oil hydraulic shovels are present. Many oil hydraulic shovels 401 have the same configuration as the configuration described above basically.

Figure 26:
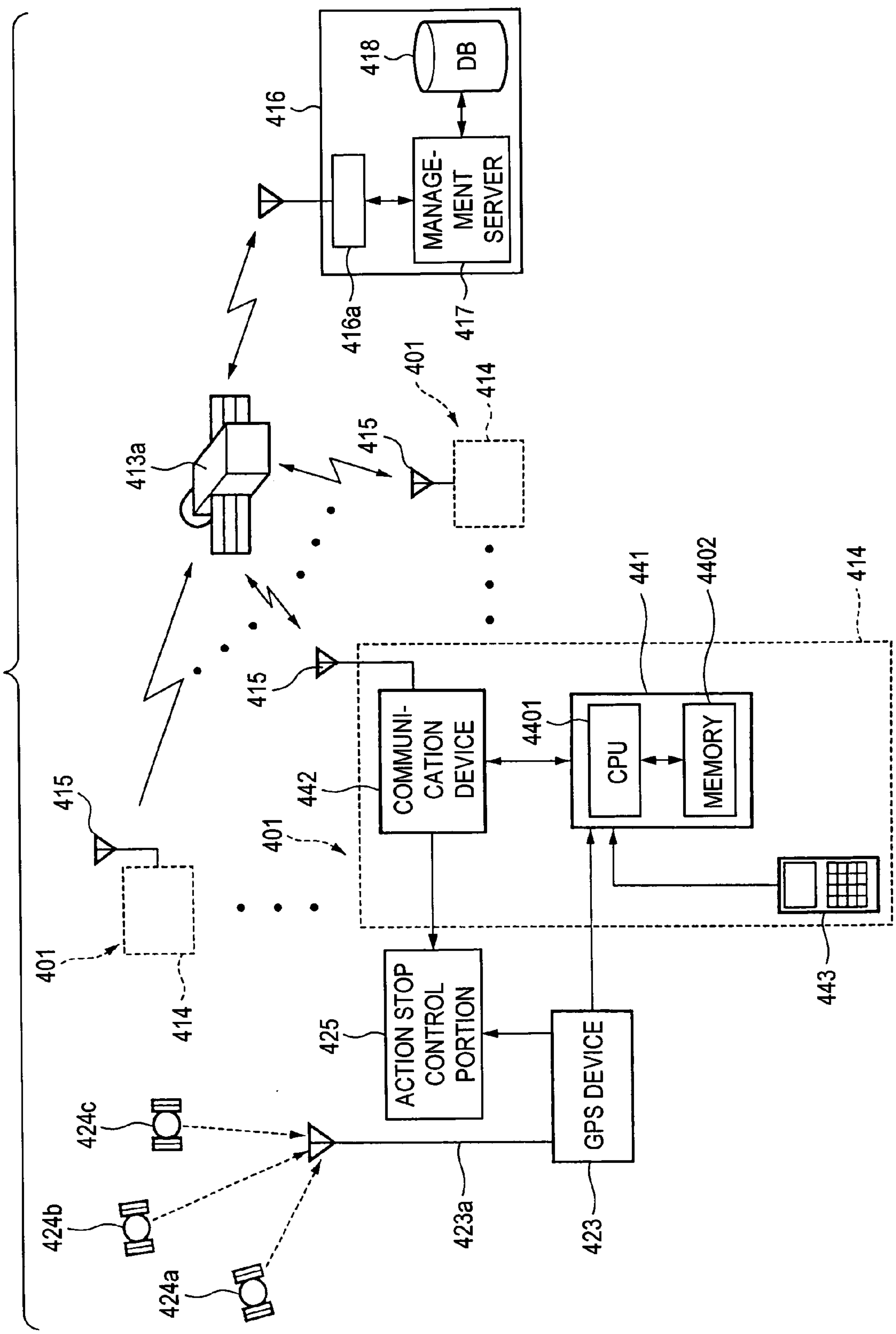
FIG. 26 is a diagram schematically showing a relation between oil hydraulic shovels arranged at each of many work sites and a base station.

FIG. 26 is a diagram schematically showing a relation between the oil hydraulic shovels 401 arranged at each of many work sites and the base station 416. Each the oil hydraulic shovel 401 comprises the control apparatus 414 including the main controller 441, the communication device 442 and the antenna 415 for communication, the GPS device and the antenna for GPS, and the action stop control portion 425. In each of the oil hydraulic shovels 401 shown by other broken line blocks excepting one block in the diagram, the GPS device etc. are omitted and drawn, but each of the oil hydraulic shovels 401 also has the same configuration.

The base station 416 is provided with a communication device 316*a*, the management server 417 and the database (DB) 418. A ten-key pad 443 for giving necessary information (the contents of change or replacement) as required is properly connected to the main controller 441. Using the communication line 413 formed by the communication satellite 413*a*, information is sent and received through the communication device 442 between each the control apparatus 414 of many oil hydraulic shovels 401 shown in FIG. 26 and the management server 417 of the base station 416.

Also, the GPS device 423 is connected to the main controller 441. The GPS device 423 receives signals given from at least three orbit satellites 424*a*, 424*b*, 424*c* through the antenna 423*a* for GPS. Further, the GPS device 423 and the communication device 442 are connected to the action stop control portion 425.

Next, internal configurations of the main controller 441, the GPS device 423 and the communication device 442 and configurations of their peripheral portions will be described with reference to FIG. 27.

The main controller 441 comprises a CPU (central processing unit) 4401, memory 4402, an input interface 4403, an output interface 4404, and an input/output interface 4405. Plural control programs 4406 for various work actions and data (such as a work area, a control parameter, a constant) 4407 necessary for control of the work actions are stored in the memory 4402.

Signals outputted from an input portion 444 on a driving operation panel provided in the driving cab 433 and plural sensors 445 provided in each portion of an oil hydraulic system or an electric system, etc. of the oil hydraulic shovel 401 are inputted to the input interface 4403. An on-off input of an engine key for turning on or off an engine is included in the input portion 444. Also, the input interface 4403 has a connection terminal 4408 and a ten-key pad 443 is connected to this connection terminal 4408 freely as required. Further, the GPS device 423 is connected to the input interface 4403.

The GPS device 423 comprises the antenna 423*a* for GPS, a GPS controller 4412, a receiving portion 4413 and a timer circuit 4414. The measured present position data of the oil hydraulic shovel 401 is inputted to the input interface 4403 through the receiving portion 4413 and the GPS controller 4412 of the GPS device 423. Since the time and date data according to universal standard time can generally be obtained from each of the orbit satellites 424*a*, 424*b*, 424*c* of the GPS satellite system 424, the measured time and date data along with the present position data are also given to the CPU 4401 through the input interface 4403. The CPU 4401 stores the present position data and the measured time and date data given from the GPS device 423 into a portion of the data 4407 of the memory 4402.

A driving and control system 446 is connected to the output interface 4404. The CPU 4401 gives a command value or a setting value for instructing its action to the driving and control system 446. Based on these command value or setting value, an action of the driving and control system 446 is controlled and the work performance mechanism portion such as the bucket 436 provided in the top of the front mechanism portion 437 is caused to perform an action necessary for work. The work performance mechanism portion includes a breaker, a wide bucket, etc. in addition to the bucket. The work performance mechanism portion is freely attached and detached with respect to the front mechanism portion 437 according to required work, and is used as attachment parts.

Also, the action stop control portion 425 is connected to the output interface 4404. The CPU 4401 compares a work area stored in a portion of the data 4407 of the memory 4402 with the present position measured by the GPS device 423, and sends an action stop signal to the action stop control portion 425 through the output interface 4404 when it is decided that the oil hydraulic shovel 401 is beyond the work area.

The communication device 442 is connected to the input/output interface 4405. The communication device 442 comprises the antenna 415 for communication, a communication controller 4409, a sending and receiving portion 4410, and a timer circuit 4411. In the case of starting of the oil hydraulic shovel 401, that is, the case of inputting ON of an engine key to the input portion 444, information is sent to the base station 416 through the communication device 442. Position information or operating information, etc. including the position data and the measured time and date data stored in the data 4407 of the memory 4402 is included in this sent information.

Incidentally, as an example of the control programs 4406 stored in the memory 4402, according to a type of the oil hydraulic shovel 401, for example, there are a program for interference prevention control, a program for performing are a limit control, a program for attitude control of a construction machine, a program for controlling operating characteristics (the maximum flow rate of pump) of an oil hydraulic pump, and so on. In these programs, a portion of the contents vary according to the front mechanism portion 437 and the work performance mechanism portion provided in the oil hydraulic shovel 401. Also, as an example of the data 4407 stored in the memory 4402, there are various sizes of the front mechanism portion 437, an interference prevention area, or parameters of a control gain, the maximum tilt angle of pump, the number of revolutions of an engine, and so on.

The GPS device 423 and the communication device 442 are connected to the action stop control portion 425. In the case of inputting ON of an engine key to the input portion 444, the GPS device 423 activates the GPS controller 4412 and receives signals from the orbit satellites 424*a*, 424*b*, 424*c* through the GPS antenna 423*a* by the receiving portion 4413. At the same time, the timer circuit 4414 starts clocking. The timer circuit 4414 clocks non-receivable time taken from the ON of the engine key to reception of the signals by the receiving portion 4413. A non-receivable signal is outputted from the GPS controller 4412 to the action stop control portion 425 on condition that this non-receivable time exceeds predetermined reference time.

In the case of inputting an engine key ON signal to the input portion 444, the communication device 442 activates the communication controller 4409, and calls position information and operating information, etc. including the position data and the measured time and date data from the memory 401. This position information and operating information are sent to the base station 416 through the sending and receiving portion 4410. At the time of this sending, the timer circuit 4411 starts clocking. With respect to information sent from the oil hydraulic shovel 401, the management server 417 of the base station 416 sends information about a command etc. to said oil hydraulic shovel 401. The timer circuit 4411 clocks non-receivable time taken to receive information sent from the management server 417. A non-receivable signal is outputted from the communication controller 4409 to the action stop control portion 425 on condition that this clocked non-receivable time exceeds predetermined reference time.

In the case of receiving the non-receivable signal from the GPS device 423 or the communication device 442, the action stop control portion 425 breaks a current-carrying system 426 or a fuel supply system 427 or an oil hydraulic system 428, and stops an action of the oil hydraulic shovel 401.

Figure 28:
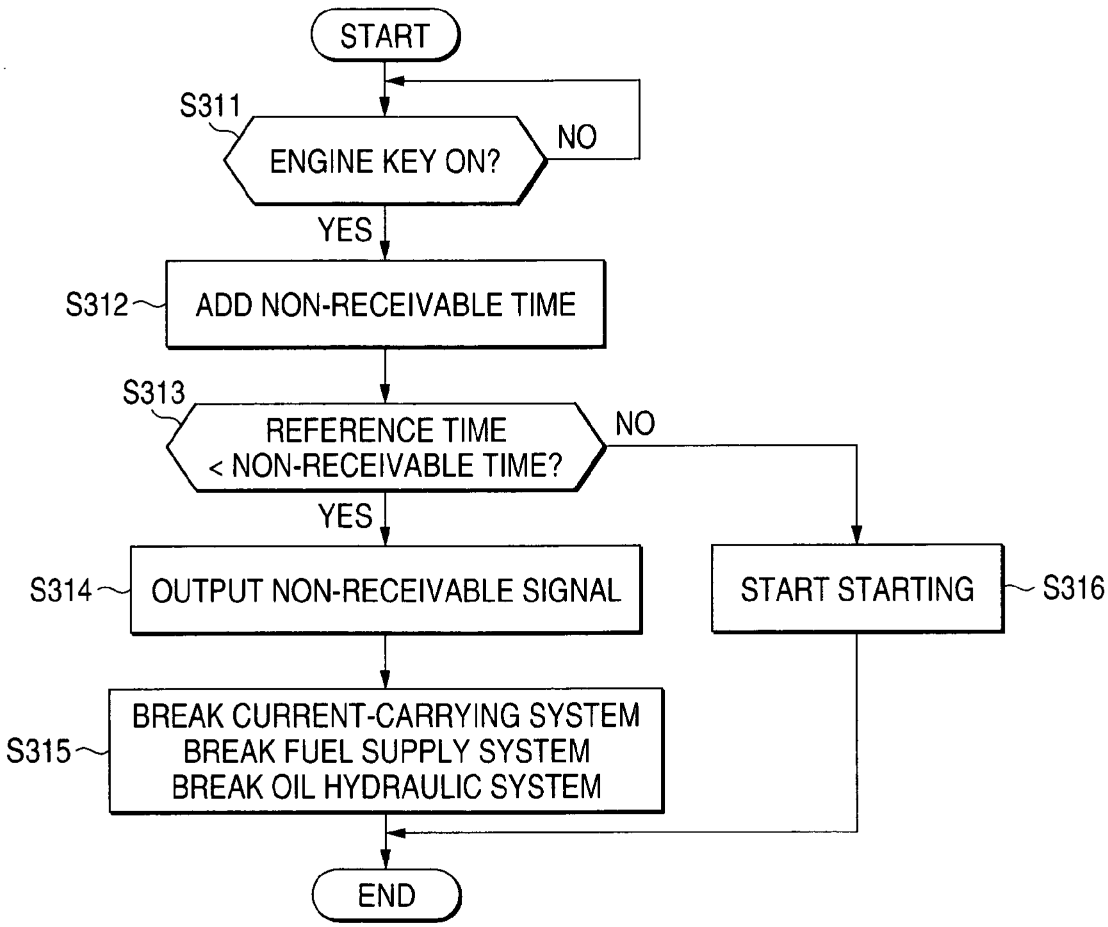
FIG. 28 is a flowchart showing a flow for stopping an action of the oil hydraulic shovel by a signal non-receivable state of the GPS device.

Next, detection of a signal non-receivable state by the GPS device 423 and the communication device 442 and an action stop of the oil hydraulic shovel 401 will be described with reference to FIGS. 28 and 29. FIG. 28 is a flowchart showing a flow for stopping an action of the oil hydraulic shovel 401 by a signal non-receivable state of the GPS device 423.

When an engine key included in the input portion 444 becomes ON or wiring is directly connected by a thief to become a power ON state (step S311), clocking is started by the timer circuit 4414 (step S312). When an on-receivable state by the GPS device 423 continues and clocked non-receivable time reaches reference time (step S313), a non-receivable signal is outputted to the action stop control portion 425 (step S314). In the case of receiving the non-receivable signal, the action stop control portion 425 breaks the current-carrying system 426, the fuel supply system 427, the oil hydraulic system 428, and shifts the oil hydraulic shovel 401 to an inoperable state (step S315). Incidentally, when it becomes a receivable state before the duration of the non-receivable state reaches the reference time, starting is performed as usual (step S316).

Figure 29:
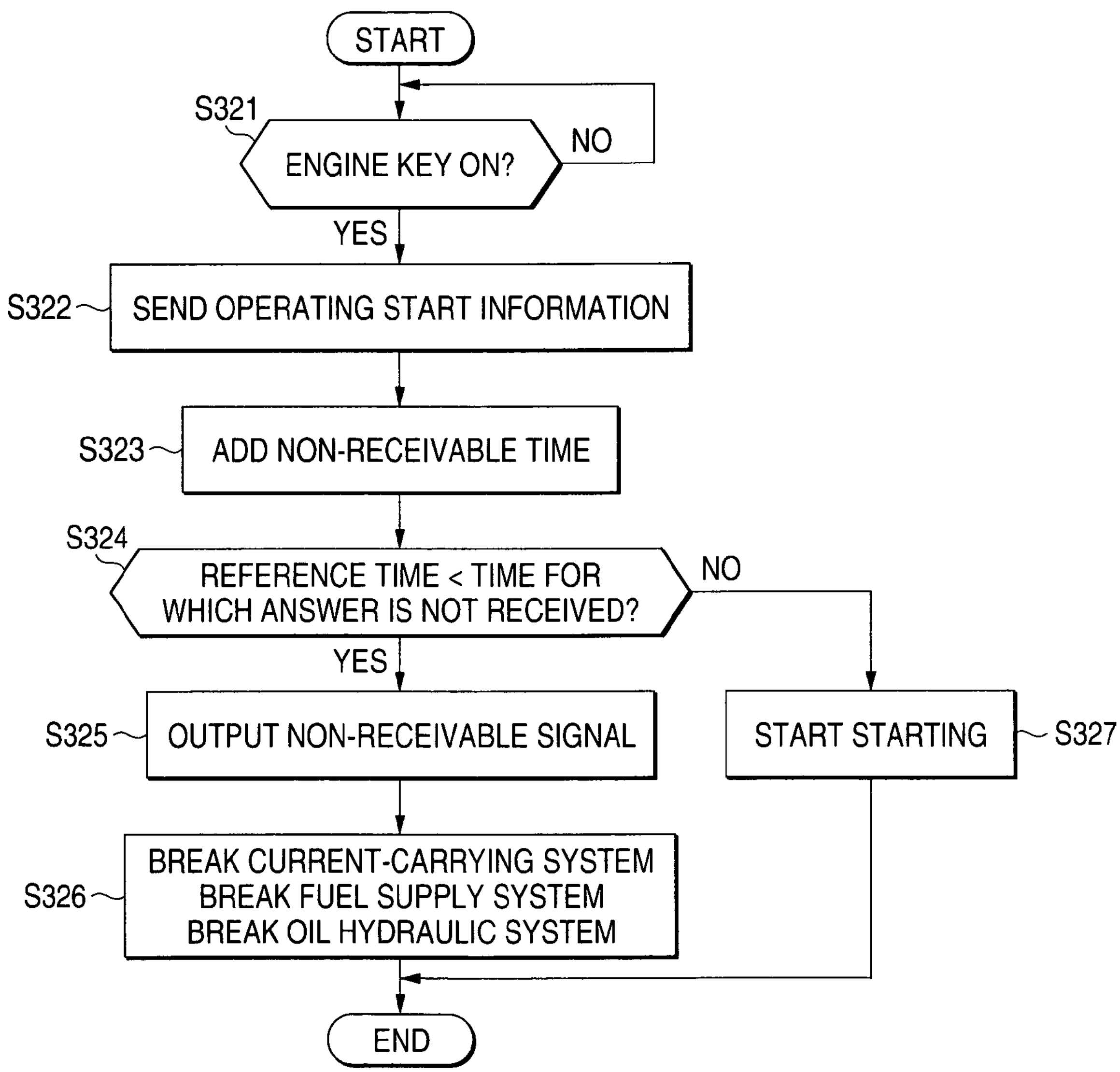
FIG. 29 is a flowchart showing a flow for stopping an action of the oil hydraulic shovel by a signal non-receivable state of the communication device.

FIG. 29 is a flowchart showing a flow for stopping an action of the oil hydraulic shovel 401 by a signal non-receivable state of the communication device 442.

When an engine key included in the input portion 444 becomes ON or wiring is directly connected by a thief to become a power ON state (step S321), the communication controller 4409 of the communication device 442 is activated and sends position information and operating information to the base station 416 through the sending and receiving portion 4410 (step S322). Concurrently with the sending, the timer circuit 4411 starts clocking (step S323). As described above, in the case of receiving information such as operating information from the oil hydraulic shovel 401, the management server 417 of the base station 416 sends information about a command etc. to said oil hydraulic shovel 401. The timer circuit 4411 clocks time taken to receive an answer of information from the management server 417. When clocked non-receivable time reaches reference time (step S324), a non-receivable signal is outputted to the action stop control portion 425 (step S325). In the case of receiving the non-receivable signal, the action stop control portion 425 breaks the current-carrying system 426, the fuel supply system 427, the oil hydraulic system 428, and shifts the oil hydraulic shovel 401 to an inoperable state (step S326). Incidentally, when the answer of information from the management server 417 is received before the duration of the non-receivable state reaches the reference time, starting is performed as usual (step S327).

The GPS device 423 can be operated not only when the oil hydraulic shovel 401 is operating but also when it is not operating. That is, after the engine key of the oil hydraulic shovel 401 is turned off after the completion of work, the GPS device 423 is shifted to an operating state (wake-up state) for a constant period regularly or irregularly. In the case of being configured thus, in order to measure a position of the oil hydraulic shovel 401, it is necessary to check that the antenna 423*a* for GPS is normal and further decide that the oil hydraulic shovel 401 is within a predetermined area. That is, the fact that the antenna 423*a* for GPS is normal means that the antenna for GPS is not destroyed and cut by a thief, and the fact that the oil hydraulic shovel 401 is within the predetermined area means that the oil hydraulic shovel is not carried away beyond the predetermined area by putting it on a trailer etc. without turning on a power source of the oil hydraulic shovel 401 by a thief.

Figure 30:
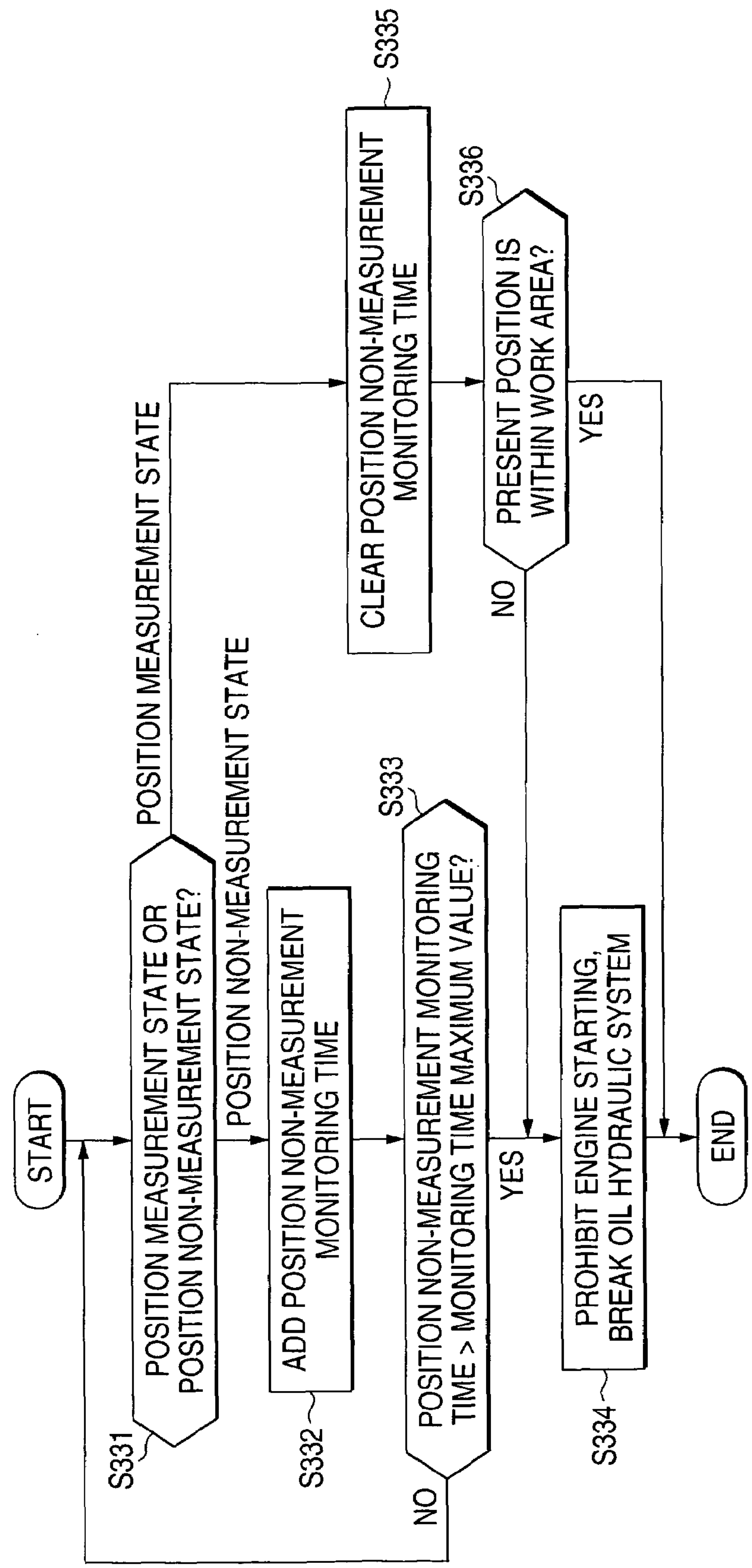
FIG. 30 is a flowchart showing a flow for stopping an action of the oil hydraulic shovel by a signal non-receivable state of a GPS signal by the GPS device.

FIG. 30 is a flowchart showing control performed in view of the circumstances described above. It is decided whether there is in a position measurement state or a position non-measurement state by the GPS controller 4412 of the GPS device 423 (step S331). When it is decided that there is in the position non-measurement state, clocking is started by the timer circuit 4414 (step S332). That is, the position non-measurement state is monitored by the timer circuit 4414. When clocked position non-measurement monitoring time exceeds a preset monitoring time maximum value (step S333), engine starting is prohibited and an oil hydraulic system is broken (step S334).

On the other hand, when the clocked position non-measurement monitoring time does not exceed the monitoring time maximum value, the flowchart returns to step S331, and it is decided that there is in the position measurement state, and the position non-measurement monitoring time is cleared (step S335). Since the GPS device 423 is in the position measurement state, it is decided whether or not the present position further measured is within a predetermined work area (step S336). When the measured present position of the oil hydraulic shovel 401 is beyond the predetermined work area, prohibition control of the engine starting and the oil hydraulic system is performed (step S334).

As described above, to stop an action of the oil hydraulic shovel 401 by deciding whether or not the GPS device 423 or the communication device 442 is in a receiving state at the time of starting of the oil hydraulic shovel 401 by the duration of the non-receivable state, or by deciding whether or not it is in a receiving state by the GPS device 423 at the time of operation or no operation of the oil hydraulic shovel 401 by monitoring time of a position non-measurement state and deciding whether or not the position further measured is within the work area in the case of deciding that there is in a position measurement state is useful for theft prevention.

However, it is also considered that the signal non-receivable state is caused due to cutting and damage to antenna wiring of the GPS device 423 or the communication device 442. That is, it is considered that the antenna wiring of the GPS device 423 or the communication device 442 is physically cut by a thief. In this case, it is desirable to stop am action of the construction machine immediately after detecting the cutting and damage to the antenna wiring without measuring the duration of the non-receivable state as described above.

Thus, a theft prevention method of the case of cutting a concentration cable 450 formed by bundling antenna wiring of a GPS device 423 and a communication device 442 and a disconnection detection wiring 429 will be proposed below as another embodiment of a theft prevention method according to the present invention.

Figure 31:
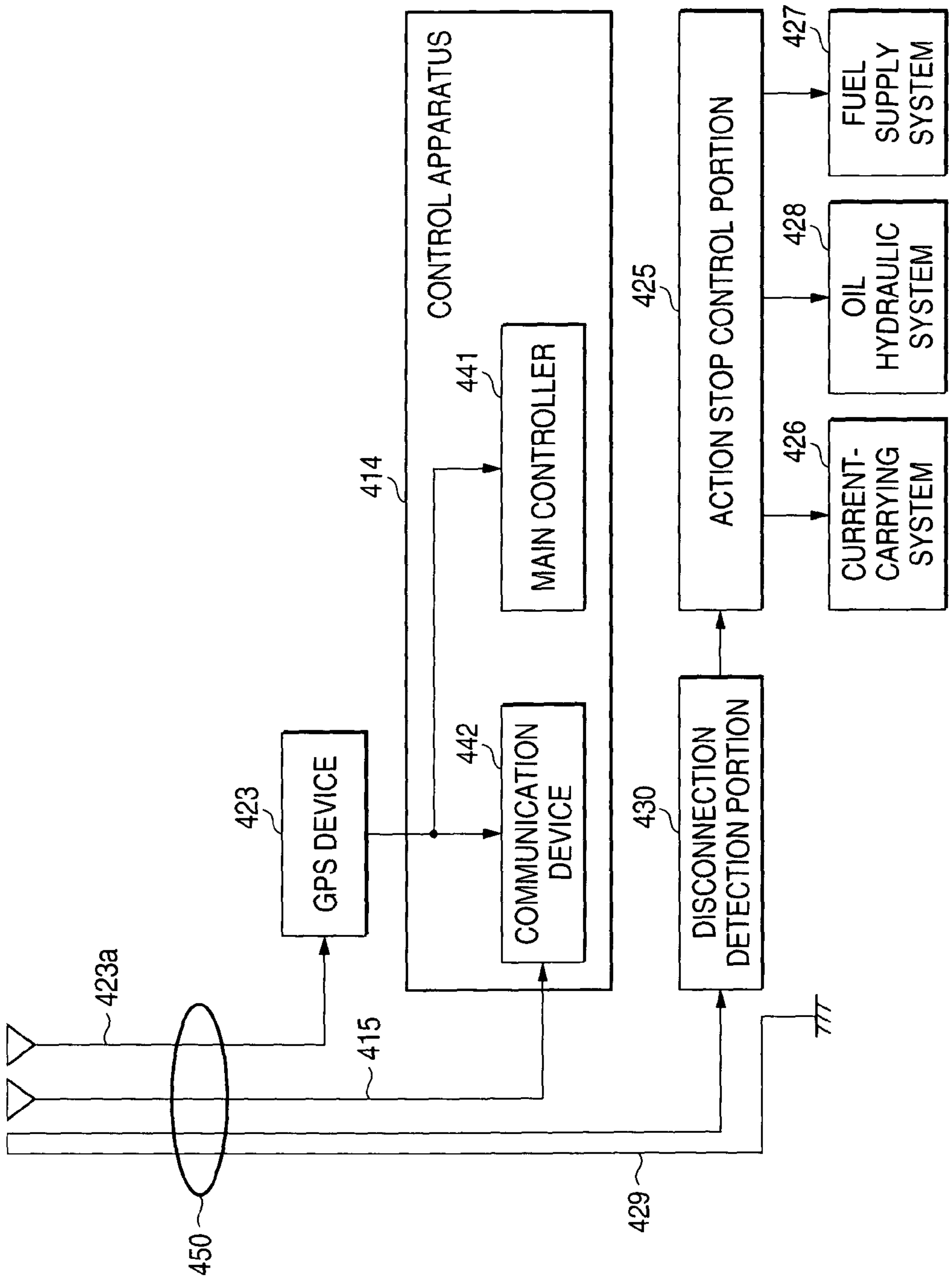
FIG. 31 is a configuration diagram of a control apparatus, a GPS device and a disconnection detection portion of an oil hydraulic shovel and their peripheral portions.

FIG. 31 is a configuration diagram of a control apparatus 414, a GPS device 423 and a disconnection detection portion 430 of an oil hydraulic shovel 401 and their peripheral portions. The control apparatus 414 comprises a main controller 441 and a communication device 442. The GPS device 423 and the communication device 442 are connected to the main controller 441. A concentration cable 450 is formed by bundling wiring of an antenna 423*a* for GPS of the GPS device 423, wiring of an antenna 415 for communication of the communication device 442 and disconnection detection wiring 429. The disconnection detection portion 430 is provided in the end of the disconnection detection wiring 429 and when disconnection is detected, a disconnection detection signal is outputted to an action stop control portion 425. In a connection state, a ground potential level is inputted to the disconnection detection portion 430 by the disconnection detection wiring 429, but when a disconnection state occurs, predetermined high voltage is applied to an input portion of the disconnection detection portion 430. As a result of this, disconnection is detected. The disconnection detection signal is outputted from the disconnection detection portion 430 by simultaneously cutting the disconnection detection wiring at the time of cutting the concentration cable for the purpose of cutting the wiring of the antenna 423*a* for GPS and the antenna 415 for communication.

Figure 32:
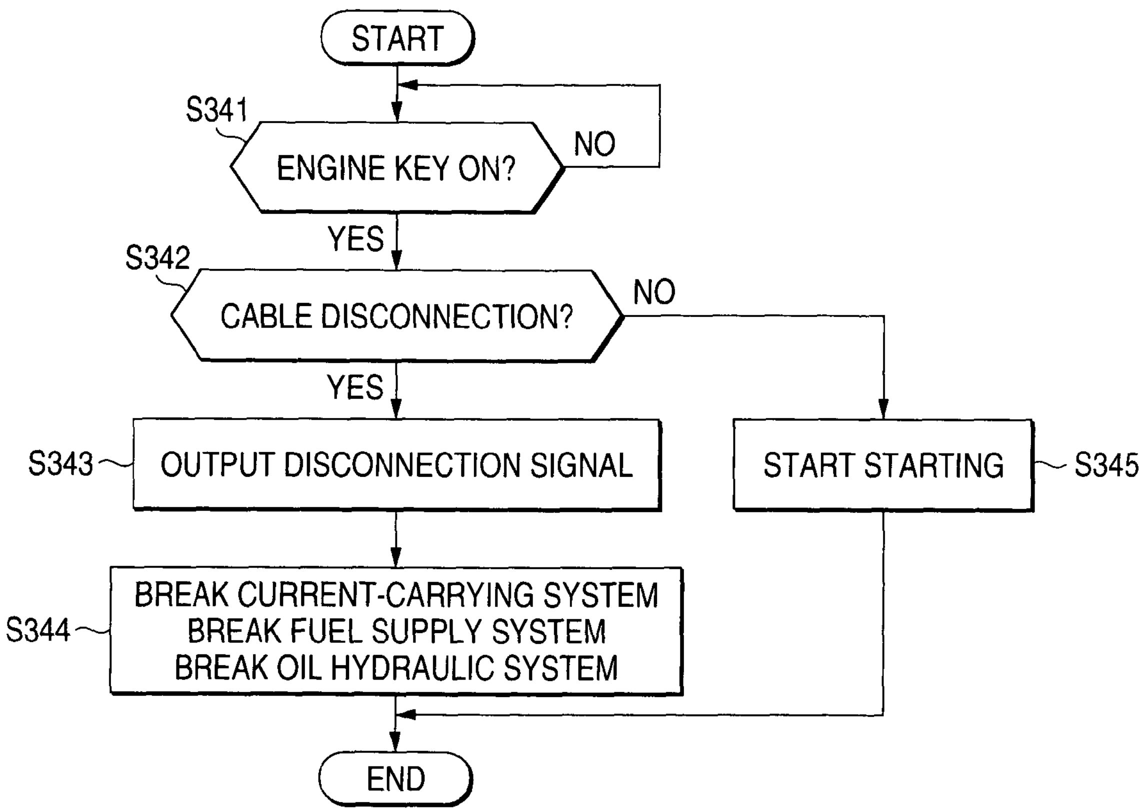
FIG. 32 is a flowchart showing a flow for stopping an action of the oil hydraulic shovel according to disconnection detection of the disconnection detection portion.

FIG. 32 is a flowchart showing a flow for stopping an action of the oil hydraulic shovel 401 according to disconnection detection of the disconnection detection portion 430.

When an engine key included in an input portion 444 becomes ON or wiring is directly connected by a thief to become a power ON state (step S341), it is determined whether or not a concentration cable has been disconnected (step S342). When disconnection of the concentration cable is detected by the disconnection detection portion 430, a disconnection detection signal is outputted (step S343). In the case of receiving the disconnection detection signal, the action stop control portion 425 breaks a current-carrying system, a fuel supply system, an oil hydraulic system, and shifts the oil hydraulic shovel 401 to an inoperable state (step S344). Incidentally, when the disconnection of the concentration cable is not detected by the disconnection detection portion 430, starting is performed as usual (step S345).

Figure 27:
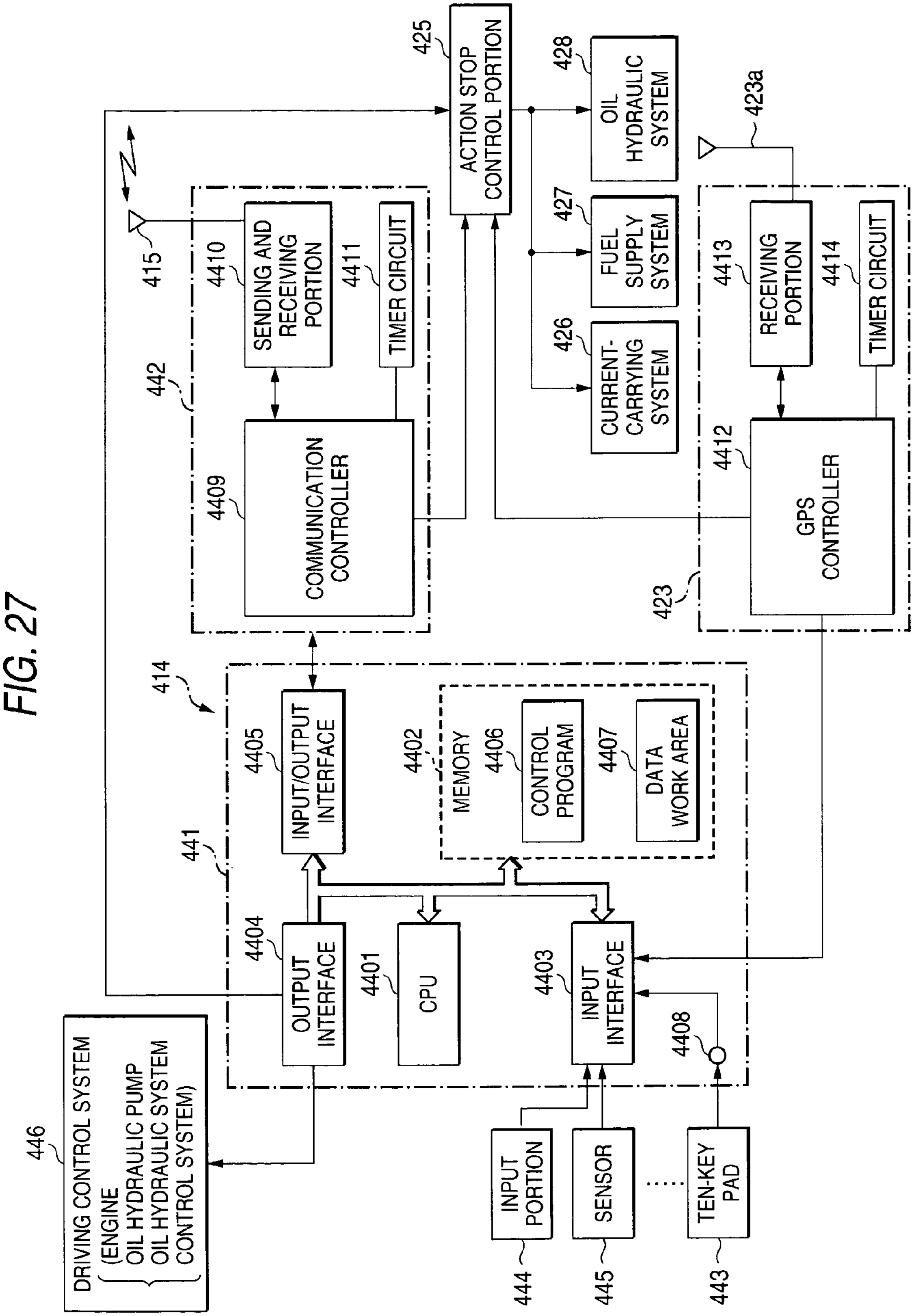
FIG. 27 is a block configuration diagram showing internal configurations of a main controller, a GPS device and a communication device of an oil hydraulic shovel for implementing a theft prevention method according to the present invention and configurations of peripheral associated portions.

In the description of the embodiments described above, in detection of the signal non-receivable state, for example, as shown in FIG. 27, it is configured so as to detect the signal non-receivable state by the communication controller 4409 of the communication device 442 or the GPS controller 4412 of the GPS device 423, but it is not limited to this. For example, it may be configured so that it is determined whether or not there is in the signal non-receivable state by the CPU 4401 of the main controller 441 and a control command of an action stop is issued to the action stop control portion 425.

Although the present invention has been described in detail with reference to particular embodiments, it is obvious by those skilled in the art that various changes and modifications can be made without departing from the spirit and scope of the present invention.

The present application is based on Japanese Patent Application (No. 127125 of 2001) filed on Apr. 25, 2001, Japanese Patent Application (No. 134289 of 2001) filed on May 1, 2001, Japanese Patent Application (No. 221517 of 2001) filed on Jul. 23, 2001 and Japanese Patent Application (No. 225260 of 2001) filed on Jul. 26, 2001, and the contents are taken herein as reference.

INDUSTRIAL APPLICABILITY

As described above in detail, according to the present invention, a management system of a construction machine capable of speedily coping with a case that a situation necessary to urgently cope with theft etc. of the construction machine occurs can be provided.

What is claimed is:

1. A security system of a construction machine, comprising:

- a construction machine comprising a data sending and receiving portion for sending first information, a storage portion for storing received information, and a control portion for controlling an operation of the construction machine,
- a base station for receiving the first information from the data sending and receiving portion of the construction machine and sending second information to the construction machine and managing the construction machine, and
- a communication device which is connected to the base station through a communication network and can send third information to the construction machine through the base station.

2. A security system of a construction machine as claimed in claim 1, characterized in that the first information relates to operating information about the construction machine, and the communication device requests acquisition of the first information from the base station.

3. A security system of a construction machine as claimed in claim 1, characterized in that the communication device comprises one or plural fixed type and portable type communication devices.

4. A security system of a construction machine as claimed in claim 1, characterized in that the communication network between the base station and the communication device is the Internet.

5. A security system of a construction machine as claimed in claim 3, characterized in that the fixed type communication device is a terminal including a personal computer capable of being connected to the communication network, and the portable type communication device includes a portable phone.

6. A security system of a construction machine as claimed in claim 1, characterized in that the first information is information about theft of the construction machine.

7. A security system of a construction machine as claimed in claim 6, characterized in that the first information is sent from the base station to the communication device by electronic mail.

8. A security system of a construction machine as claimed in claim 6, characterized in that the storage portion stores an operable operating area, and the control portion decides that the construction machine has been stolen when it is detected that the construction machine moves beyond the operating area.

9. A security system of a construction machine as claimed in claim 8, characterized in that the second information includes information about the operating area and is stored in the storage portion as a new operating area when the construction machine receives the information about the operating area.

10. A security system of a construction machine as claimed in claim 9, characterized in that the communication device sends the third information to the base station and thereby the base station sends the second information to the construction machine.

11. A security system of a construction machine as claimed in claim 10, characterized in that the construction machine sends an answer back signal indicating the completion of setting of the operating area to the base station when the operating area is set.

12. A security system of a construction machine as claimed in claim 1, characterized in that the first information includes information about failure/accident of the construction machine.

13. A security system of a construction machine as claimed in claim 1, characterized in that the first information includes information as to whether the construction machine is operating or stopping at present and information about cumulative operating time; the communication device requests the base station to acquire the first information from the construction machine; and the base station sends the second information so as to acquire the first information from the construction machine at a point in time of receiving the third information from the communication device.

14. A security system of a construction machine as claimed in claim 1, characterized in that information about an operation of the construction machine is regularly sent from the construction machine to the base station as operating history information, and the operating information about the construction machine is acquired by the communication device through the Internet.

15. A security system of a construction machine as claimed in claim 1, characterized in that the second information sent from the base station relates to an operable time zone or an operable period of the construction machine; the storage portion of the construction machine stores the operable time zone or the operable period of the construction machine based on the second information; and the control portion of the construction machine prohibits an operation of the construction machine beyond the operable time zone or the operable period stored.

16. A security system of a construction machine as claimed in claim 15, characterized in that the third information sent from the communication device relates to the operable time zone or the operable period in the base station, and the base station sends the second information to the construction machine based on the third information received from the communication device.

17. A security system of a construction machine as claimed in claim 15, characterized in that the operation includes at least travel.

18. A security system of a construction machine as claimed in claim 8, characterized in that the construction machine comprises a position detecting portion for detecting a position of said construction machine; and when a predetermined operation is performed with respect to the construction machine, the control portion reads the operating area stored in the storage portion and also inputs the present position information of the construction machine from the position detecting portion and compares the operating area with the position information of the construction machine.

19. A security system of a construction machine as claimed in claim 18, characterized in that in the case of deciding that the construction machine is beyond the operating area, the control portion outputs a signal for prohibiting an operation of the construction machine.

20. A security system of a construction machine as claimed in claim 18, characterized in that in the case of deciding that the construction machine is beyond the operating area, the control portion sends the decision result to the base station side.

21. A security system of a construction machine as claimed in claim 18, characterized in that the communication device is a portable type communication terminal.

22. A security system of a construction machine as claimed in claim 21, characterized in that the portable type communication terminal is a portable phone.

23. A security system of a construction machine as claimed in claim 18, characterized in that the base station provides map information, and the base station or the communication device reads the map information, and the operating area is set based on this read map information.

24. A security system of a construction machine as claimed in claim 23, characterized in that the map information is divided into plural sections, and the base station or the communication device selects and sets an operating area from among the divided sections.

25. A security system of a construction machine as claimed in claim 18, characterized in that plural areas can be set as the operable area.

26. A security system of a construction machine as claimed in claim 18, characterized in that the predetermined operation is a starting operation of a prime mover provided in the construction machine.

27. A security system of a construction machine as claimed in claim 1, characterized in that the construction machine comprises a position detecting portion for detecting a position of the construction machine; and when a state in which a signal according to information from the outside cannot be received by the control portion of the construction machine occurs and the duration of the signal non-receivable state exceeds reference time, the control portion prohibits engine starting of the construction machine or breaks an oil hydraulic system.

28. A security system of a construction machine as claimed in claim 27, characterized in that when a state in which a signal according to a position by the position detecting portion cannot be received occurs and the duration of the signal non-receivable state exceeds reference time, engine starting of the construction machine is prohibited or an oil hydraulic system is broken.

29. A security system of a construction machine as claimed in claim 27, characterized in that when a state in which the control portion cannot receive a signal according to information from the center server occurs and the duration of the signal non-receivable state exceeds reference time, engine starting of the construction machine is prohibited or an oil hydraulic system is shut off.

30. A security system of a construction machine as claimed in claim 1, characterized in that the construction machine comprises a disconnection detection portion comprising a disconnection detection wiring, and a concentration cable formed by bundling antenna wiring of the position detecting portion, antenna wiring of the sending and receiving portion and the disconnection detection wiring; and when the disconnection detection wiring is cut at the time of cutting of the concentration cable, the control portion prohibits engine starting of the construction machine or breaks an oil hydraulic system according to a disconnection detection signal sent from the disconnection detection portion.

31. A security system of a construction machine as claimed in claim 27, characterized in that the engine starting is prohibited by breaking a current-carrying system or a fuel supply system of the construction machine.

32. A security system of a construction machine as claimed in claim 30, characterized in that the engine starting is prohibited by breaking a current-carrying system or a fuel supply system of the construction machine.

* * * * *